US012568452B2

(12) United States Patent
Liu et al.

(10) Patent No.: US 12,568,452 B2
(45) Date of Patent: Mar. 3, 2026

(54) SYNCHRONIZATION SIGNAL TRANSMISSION METHOD AND APPARATUS

(71) Applicant: Huawei Technologies Co., Ltd., Shenzhen (CN)

(72) Inventors: Fengwei Liu, Chengdu (CN); Lei Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 370 days.

(21) Appl. No.: 18/174,011

(22) Filed: Feb. 24, 2023

(65) Prior Publication Data

US 2023/0209487 A1 Jun. 29, 2023

Related U.S. Application Data

(63) Continuation of application No. PCT/CN2020/112742, filed on Aug. 31, 2020.

(51) Int. Cl.
*H04W 56/00* (2009.01)

(52) U.S. Cl.
CPC .............................. *H04W 56/0015* (2013.01)

(58) Field of Classification Search
CPC ........... H04L 27/26025; H04L 27/2603; H04L 27/261; H04L 5/0023; H04L 5/005; H04L 5/0053; H04L 5/0094; H04W 56/0015
See application file for complete search history.

(56) References Cited

U.S. PATENT DOCUMENTS

| 2019/0037509 A1 | 1/2019 | Li et al. | |
| 2021/0045098 A1* | 2/2021 | Bi ......................... | H04W 68/02 |
| 2021/0258895 A1* | 8/2021 | Sakhnini ................. | H04W 8/22 |

(Continued)

FOREIGN PATENT DOCUMENTS

| CN | 110249582 A | 9/2019 |
| CN | 110958620 A | 4/2020 |

(Continued)

OTHER PUBLICATIONS

3GPP TS 38.133 V16.1.0 (Sep. 2019), "3rd Generation Partnership Project; Technical Specification Group Radio Access Network; NR; Requirements for support of radio resource management (Release 16)," 1043 pages.

(Continued)

*Primary Examiner* — Derrick V Rose
(74) *Attorney, Agent, or Firm* — Slater Matsil, LLP

(57) ABSTRACT

This application discloses a synchronization signal transmission method and an apparatus. The method includes: A network device sends a first synchronization signal block SSB at a first candidate location, and sends a second SSB at a second candidate location, where there is a correspondence between the first candidate location and the second candidate location; a terminal obtains, through detection, the first SSB at the first candidate location; the terminal determines the second candidate location based on the first candidate location, and obtains, through detection, the second SSB at the second candidate location; and the terminal performs physical broadcast channel PBCH detection or reference signal received power RSRP measurement based on the first SSB and/or the second SSB.

20 Claims, 13 Drawing Sheets

(56)                References Cited

U.S. PATENT DOCUMENTS

| 2021/0329577 | A1* | 10/2021 | Jiang | ..................... | H04J 11/0076 |
|---|---|---|---|---|---|
| 2021/0385774 | A1* | 12/2021 | He | ..................... | H04W 56/0015 |
| 2022/0086922 | A1* | 3/2022 | He | ..................... | H04W 56/001 |
| 2023/0189171 | A1* | 6/2023 | Mu | ..................... | H04W 56/001 |
| | | | | | 370/350 |

FOREIGN PATENT DOCUMENTS

| EP | 3537784 | A1 | 9/2018 |
|---|---|---|---|
| EP | 3691374 | A1 | 8/2020 |
| EP | 3694271 | A1 | 8/2020 |
| EP | 3927002 | A1 | 12/2021 |
| EP | 4099769 | A1 | 12/2022 |
| WO | 2020164594 | A1 | 8/2020 |

OTHER PUBLICATIONS

3GPP TS 38.211 V16.1.0 (Mar. 2020), "3rd Generation Partnership Project; Technical Specification Group Radio Access Network; NR; Physical channels and modulation (Release 16)," 130 pages.
3GPP TS 38.212 V16.1.0 (Mar. 2020), "3rd Generation Partnership Project; Technical Specification Group Radio Access Network; NR; Multiplexing and channel coding (Release 16)," 146 pages.
3GPP TS 38.213 V16.1.0 (Mar. 2020), "3rd Generation Partnership Project; Technical Specification Group Radio Access Network; NR; Physical layer procedures for control (Release 16)," 156 pages.
3GPP TS 38.214 V16.1.0 (Mar. 2020), "3rd Generation Partnership Project; Technical Specification Group Radio Access Network; NR; Physical layer procedures for data (Release 16)," 151 pages.
3GPP TS 38.306 V16.1.0 (Jul. 2020), "3rd Generation Partnership Project; Technical Specification Group Radio Access Network; NR; User Equipment (UE) radio access capabilities (Release 16)," 106 pages.
3GPP TS 38.321 V16.1.0 (Jul. 2020), "3rd Generation Partnership Project; Technical Specification Group Radio Access Network; NR; Medium Access Control (MAC) protocol specification (Release 16)," 151 pages.
3GPP TS 38.331 V16.1.0 (Jul. 2020), "3rd Generation Partnership Project; Technical Specification Group Radio Access Network; NR; Radio Resource Control (RRC) protocol specification (Release 16)," 906 pages.
Huawei, et al., "Remaining issues on beam management," 3GPP TSG RAN WG1 Meeting #93, Busan, Korea, May 21-25, 2018, R1-1805952, 6 pages.
Moderator (ZTE Corporation)," Feature lead summary on coverage enhancement for channels other than PUSCH and PUCCH," 3GPP TSG RAN WG1 #102-e, e-Meeting, Aug. 17-28, 2020, R1-2007392, 53 pages.
TCL, "Required changes to NR using existing DL/UL NR waveform," 3GPP TSG RAN WG1 #102-e, e-Meeting, Aug. 17-28, 2020, R1-2005766, 10 pages.
Vivo, "Discussion on potential techniques for coverage enhancements," 3GPP TSG RAN WG1 #101, e-Meeting, May 25-Jun. 5, 2020, R1-2003437, 9 pages.
3GPP TSG RAN WG1 #101 R1-2003355: "Discussion on NRU SSB monitoring capabilities", vivo, May 25-Jun. 5, 2020, total 3 pages.

* cited by examiner

| | PBCH PRB | | PSS PRB |
|---|---|---|---|
| | PBCH RE | | PSS RE |
| | SSS PRB | | Zero-power PRB |
| | SSS RE | | Zero-power RE |
| | DMRS RE | | |

FIG. 2

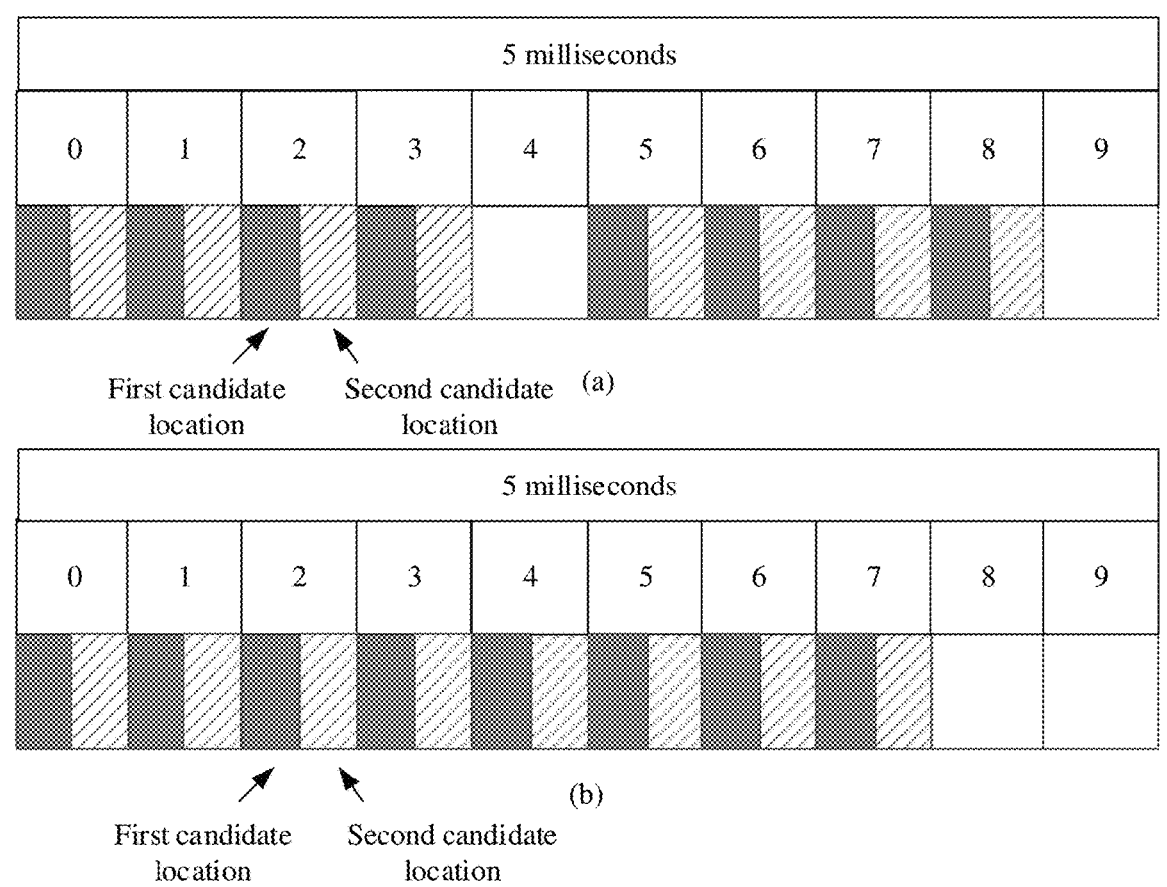
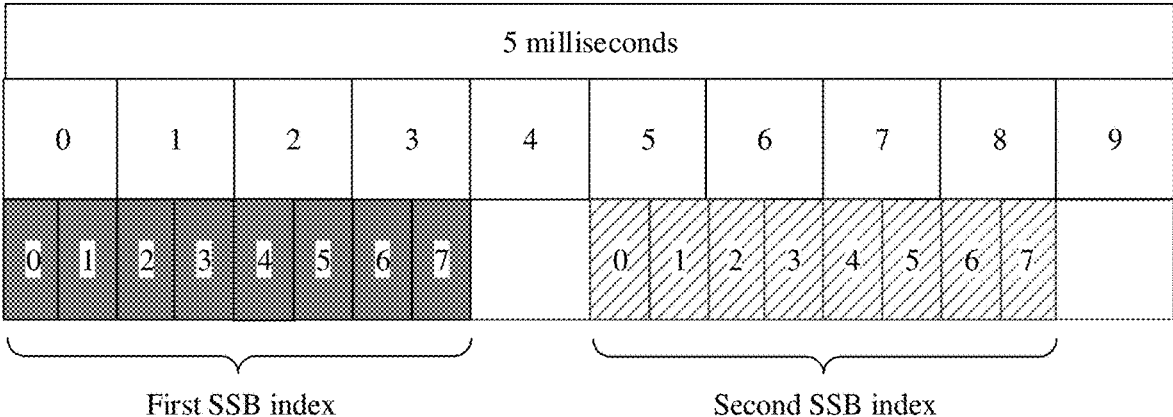
FIG. 3H
FIG. 3I

Frequency domain method 1

(a)

Frequency domain method 2

(b)

Code domain method (c)

400

500

SYNCHRONIZATION SIGNAL TRANSMISSION METHOD AND APPARATUS

CROSS-REFERENCE TO RELATED APPLICATIONS

This application is a continuation of International Application No. PCT/CN2020/112742, filed on Aug. 31, 2020, the disclosure of which is hereby incorporated by reference in its entirety.

TECHNICAL FIELD

This application relates to the field of communication technologies, and in particular, to a synchronization signal transmission method and an apparatus.

BACKGROUND

A massive multiple-input multiple-output (MIMO) technology can significantly improve a capacity and a coverage capability of a wireless communication system, has attracted wide attention in academic and industrial communities, and is used in an actual system. For example, a new radio (NR) base station may be equipped with dozens or even hundreds of antenna array elements, to implement uplink and downlink transmission that is based on the massive MIMO technology. It can be predicted that a larger quantity of antenna arrays may be used in a future communication system to continuously improve transmission performance.

For channel information at a transmitting end, coverage and capacity improvement potentials of the massive MIMO technology can be fully mined. Downlink sending is used as an example. A (massive) MIMO system may obtain the channel information at the transmitting end in the following manner.

A terminal feeds back downlink channel state information (CSI), and this is applicable to a frequency division duplexing (FDD) system and a time division duplexing (TDD) system. The terminal measures downlink channel information by using a channel state information-reference signal (CSI-RS), and feeds back information such as a codebook to the base station.

The base station measures the downlink CSI, and this is applicable to the TDD system. The base station measures an uplink channel by using a sounding reference signal (SRS) sent by the terminal, and then deduces a downlink channel by using reciprocity between uplink and downlink signals.

After obtaining the downlink channel information, the base station may select an appropriate transmitting scheme, to implement high-performance downlink sending. It should be noted that a prerequisite for the base station to obtain the channel information at the transmitting end is that a connection has been established between the base station and the terminal. Therefore, the base station usually uses the channel information at the transmitting end when sending a user-level signal.

To enable the terminal to perform initial access, the base station further needs to send some cell-level channels or signals such as synchronization signal blocks (SSBs). Because channel information of a specific user cannot be used at the transmitting end, the base station usually sends the cell-level channel or signal such as the SSB in a beam sweeping manner, and an array gain that can be obtained is low. With the increasing quantity of base station arrays, the cell-level signal or channel may hinder downlink coverage.

SUMMARY

Embodiments of this application provide a synchronization signal transmission method and an apparatus, to resolve a problem of insufficient cell-level signal coverage in a massive MIMO application scenario.

According to a first aspect, a synchronization signal transmission method is provided. The method includes: A terminal obtains, through detection, a first synchronization signal block SSB at a first candidate location; the terminal determines a second candidate location based on the first candidate location, and obtains, through detection, a second SSB at the second candidate location, where there is a correspondence between the first candidate location and the second candidate location; and the terminal performs physical broadcast channel PBCH detection or reference signal received power RSRP measurement based on the first SSB and/or the second SSB.

In a possible example, the correspondence is a correspondence between slot locations and/or symbol locations occupied by the first candidate location and the second candidate location in one data half-frame.

In a possible example, the correspondence between the slot locations and/or the symbol locations includes locations with a same symbol index that are occupied by the first candidate location and the second candidate location in slots with a fixed interval.

In a possible example, the correspondence between the slot locations and/or the symbol locations includes symbol locations with a fixed interval that are of the first candidate location and the second candidate location in a same slot, and the fixed interval is equal to or greater than a quantity of symbols occupied by the first SSB.

In a possible example, when a subcarrier spacing is 30 kHz, an index of a start symbol occupied by the first candidate location is $\{4, 8, 16, 20\}+28*n$, where $n=0$ or 1; and an index of a start symbol occupied by the second candidate location is $\{4, 8, 16, 20\}+28*n+14$, where $n=2$ or 3; an index of a start symbol occupied by the second candidate location is $\{4, 8, 16, 20\}+28*n-14$, where $n=3$ or 4; or an index of a start symbol occupied by the second candidate location is $\{4, 8, 16, 20\}+28*n$, where $n=2$ or 3.

In a possible example, when a subcarrier spacing is 30 kHz, an index of a start symbol occupied by the first candidate location is $\{2, 8\}+14*n$, where $n=0, 1, 2,$ or 3; and an index of a start symbol occupied by the second candidate location is $\{2, 8\}+14*n$, where $n=5, 6, 7,$ or 8; or an index of a start symbol occupied by the second candidate location is $\{2, 8\}+14*n$, where $n=4, 5, 6,$ or 7.

In a possible example, when a subcarrier spacing is 30 kHz, an index of a start symbol occupied by the first candidate location is $\{4, 16\}+28*n$, where $n=0$ or 1, and the index is $\{4, 16\}+28*m+14$, where $m=2$ or 3; and an index of a start symbol occupied by the second candidate location is $\{8, 20\}+28*n$, where $n=0$ or 1, and the index is $\{8, 20\}+28*m+14$, where $m=2$ or 3.

In a possible example, when a subcarrier spacing is 30 kHz, an index of a start symbol occupied by the first candidate location is $\{4, 16\}+28*n$, where $n=0, 1, 2,$ or 3; and an index of a start symbol occupied by the second candidate location is $\{8, 20\}+28*n$, where $n=0, 1, 2,$ or 3.

In a possible example, when a subcarrier spacing is 30 kHz, an index of a start symbol occupied by the first candidate location is $2+14*n$, where $n=0, 1, 2, 3, 5, 6, 7,$ or 8; and an index of a start symbol occupied by the second candidate location is $8+14*n$, where $n=0, 1, 2, 3, 5, 6, 7,$ or 8.

In a possible example, when a subcarrier spacing is 30 kHz, an index of a start symbol occupied by the first candidate location is 2+14*n, where n=0, 1, 2, 3, 4, 5, 6, or 7; and an index of a start symbol occupied by the second candidate location is 8+14*n, where n=0, 1, 2, 3, 4, 5, 6, or 7.

In a possible example, there is a correspondence between the first SSB and the second SSB.

In a possible example, the correspondence includes: The terminal assumes that there is a quasi co-location QCL relationship or a co-port relationship between the first SSB and the second SSB.

In a possible example, there is a frequency domain offset between the second SSB and the first SSB, and the first SSB is located in a synchronization raster.

In a possible example, there is a frequency domain offset between a composition signal of the second SSB and a composition signal of the first SSB, and the composition signal includes a primary synchronization signal PSS and/or a secondary synchronization signal SSS.

In a possible example, a PSS sequence of the second SSB is different from a PSS sequence of the first SSB, or the second SSB does not include a PSS.

According to a second aspect, a synchronization signal transmission method is provided. The method includes:

A network device sends a first SSB at a first candidate location; the network device determines a second candidate location based on a correspondence between the first candidate location and the second candidate location; and the network device sends a second SSB at the second candidate location.

In a possible example, the correspondence is a correspondence between slot locations and/or symbol locations occupied by the first candidate location and the second candidate location in one data half-frame, and the network device determines the second candidate location based on the slot location and/or the symbol location of the first candidate location.

In a possible example, the correspondence between the slot locations and/or the symbol locations includes locations with a same symbol index that are occupied by the first candidate location and the second candidate location in slots with a fixed interval.

In a possible example, the correspondence between the slot locations and/or the symbol locations includes symbol locations with a fixed interval that are of the first candidate location and the second candidate location in a same slot, and the fixed interval is equal to or greater than a quantity of symbols occupied by the first SSB.

In a possible example, when a subcarrier spacing is 30 kHz, an index of a start symbol occupied by the first candidate location is {4, 8, 16, 20}+28*n, where n=0 or 1; and the network device determines that an index of a start symbol occupied by the second candidate location is {4, 8, 16, 20}+28*n+14, where n=2 or 3; the network device determines that an index of a start symbol occupied by the second candidate location is {4, 8, 16, 20}+28*n−14, where n=3 or 4; or the network device determines that an index of a start symbol occupied by the second candidate location is {4, 8, 16, 20}+28*n, where n=2 or 3.

In a possible example, when a subcarrier spacing is 30 kHz, an index of a start symbol occupied by the first candidate location is {2, 8}+14*n, where n=0, 1, 2, or 3; and the network device determines that an index of a start symbol occupied by the second candidate location is {2, 8}+14*n, where n=5, 6, 7, or 8; or the network device determines that an index of a start symbol occupied by the second candidate location is {2, 8}+14*n, where n=4, 5, 6, or 7.

In a possible example, when a subcarrier spacing is 30 kHz, an index of a start symbol occupied by the first candidate location is {4, 16}+28*n, where n=0 or 1, and the index is {4, 16}+28*m+14, where m=2 or 3; and the network device determines that an index of a start symbol occupied by the second candidate location is {8, 20}+28*n, where n=0 or 1, and the index is {8, 20}+28*m+14, where m=2 or 3.

In a possible example, when a subcarrier spacing is 30 kHz, an index of a start symbol occupied by the first candidate location is {4, 16}+28*n, where n=0, 1, 2, or 3; and the network device determines that an index of a start symbol occupied by the second candidate location is {8, 20}+28*n, where n=0, 1, 2, or 3.

In a possible example, when a subcarrier spacing is 30 kHz, an index of a start symbol occupied by the first candidate location is 2+14*n, where n=0, 1, 2, 3, 5, 6, 7, or 8; and the network device determines that an index of a start symbol occupied by the second candidate location is 8+14*n, where n=0, 1, 2, 3, 5, 6, 7, or 8.

In a possible example, when a subcarrier spacing is 30 kHz, an index of a start symbol occupied by the first candidate location is 2+14*n, where n=0, 1, 2, 3, 4, 5, 6, or 7; and the network device determines that an index of a start symbol occupied by the second candidate location is 8+14*n, where n=0, 1, 2, 3, 4, 5, 6, or 7.

In a possible example, there is a correspondence between the first SSB and the second SSB.

In a possible example, there is a frequency domain offset between the second SSB and the first SSB, and the first SSB is located in a synchronization raster.

In a possible example, there is a frequency domain offset between a composition signal of the second SSB and a composition signal of the first SSB, and the composition signal includes a primary synchronization signal PSS and/or a secondary synchronization signal SSS.

In a possible example, a PSS sequence of the second SSB is different from a PSS sequence of the first SSB, or the second SSB does not include a PSS.

According to a third aspect, a communication apparatus is provided. The apparatus includes a communication module and a processing module, where the processing module is configured to obtain, through detection by using the communication module, a first synchronization signal block SSB at a first candidate location; the processing module is further configured to: determine a second candidate location based on the first candidate location, and obtain, through detection, a second SSB at the second candidate location, where there is a correspondence between the first candidate location and the second candidate location; and the processing module is further configured to perform physical broadcast channel PBCH detection or reference signal received power RSRP measurement based on the first SSB and/or the second SSB.

In a possible example, the correspondence is a correspondence between slot locations and/or symbol locations occupied by the first candidate location and the second candidate location in one data half-frame.

In a possible example, the correspondence between the slot locations and/or the symbol locations includes locations with a same symbol index that are occupied by the first candidate location and the second candidate location in slots with a fixed interval.

In a possible example, the correspondence between the slot locations and/or the symbol locations includes symbol locations with a fixed interval that are of the first candidate location and the second candidate location in a same slot, and the fixed interval is equal to or greater than a quantity of symbols occupied by the first SSB.

In a possible example, when a subcarrier spacing is 30 kHz, an index of a start symbol occupied by the first candidate location is $\{4, 8, 16, 20\}+28*n$, where n=0 or 1; and an index of a start symbol occupied by the second candidate location is $\{4, 8, 16, 20\}+28*n+14$, where n=2 or 3; an index of a start symbol occupied by the second candidate location is $\{4, 8, 16, 20\}+28*n-14$, where n=3 or 4; or an index of a start symbol occupied by the second candidate location is $\{4, 8, 16, 20\}+28*n$, where n=2 or 3.

In a possible example, when a subcarrier spacing is 30 kHz, an index of a start symbol occupied by the first candidate location is $\{2, 8\}+14*n$, where n=0, 1, 2, or 3; and an index of a start symbol occupied by the second candidate location is $\{2, 8\}+14*n$, where n=5, 6, 7, or 8; or an index of a start symbol occupied by the second candidate location is $\{2, 8\}+14*n$, where n=4, 5, 6, or 7.

In a possible example, when a subcarrier spacing is 30 kHz, an index of a start symbol occupied by the first candidate location is $\{4, 16\}+28*n$, where n=0 or 1, and the index is $\{4, 16\}+28*m+14$, where m=2 or 3; and an index of a start symbol occupied by the second candidate location is $\{8, 20\}+28*n$, where n=0 or 1, and the index is $\{8, 20\}+28*m+14$, where m=2 or 3.

In a possible example, when a subcarrier spacing is 30 kHz, an index of a start symbol occupied by the first candidate location is $\{4, 16\}+28*n$, where n=0, 1, 2, or 3; and an index of a start symbol occupied by the second candidate location is $\{8, 20\}+28*n$, where n=0, 1, 2, or 3.

In a possible example, when a subcarrier spacing is 30 kHz, an index of a start symbol occupied by the first candidate location is $2+14*n$, where n=0, 1, 2, 3, 5, 6, 7, or 8; and an index of a start symbol occupied by the second candidate location is $8+14*n$, where n=0, 1, 2, 3, 5, 6, 7, or 8.

In a possible example, when a subcarrier spacing is 30 kHz, an index of a start symbol occupied by the first candidate location is $2+14*n$, where n=0, 1, 2, 3, 4, 5, 6, or 7; and an index of a start symbol occupied by the second candidate location is $8+14*n$, where n=0, 1, 2, 3, 4, 5, 6, or 7.

In a possible example, there is a correspondence between the first SSB and the second SSB.

In a possible example, the correspondence includes: The terminal assumes that there is a quasi co-location relationship or a co-port relationship between the first SSB and the second SSB.

In a possible example, there is a frequency domain offset between the second SSB and the first SSB, and the first SSB is located in a synchronization raster.

In a possible example, there is a frequency domain offset between a composition signal of the second SSB and a composition signal of the first SSB, and the composition signal includes a primary synchronization signal PSS and/or a secondary synchronization signal SSS.

According to a fourth aspect, a communication apparatus is provided. The apparatus includes a communication module and a processing module, where the communication module is configured to send a first SSB at a first candidate location; the processing module is configured to determine a second candidate location based on a correspondence between the first candidate location and the second candidate location; and the communication module is further configured to send a second SSB at the second candidate location.

In a possible example, the correspondence is a correspondence between slot locations and/or symbol locations occupied by the first candidate location and the second candidate location in one data half-frame, and the processing module is specifically configured to determine the second candidate location based on the slot location and/or the symbol location of the first candidate location.

In a possible example, the correspondence between the slot locations and/or the symbol locations includes locations with a same symbol index that are occupied by the first candidate location and the second candidate location in slots with a fixed interval.

In a possible example, the correspondence between the slot locations and/or the symbol locations includes symbol locations with a fixed interval that are of the first candidate location and the second candidate location in a same slot, and the fixed interval is equal to or greater than a quantity of symbols occupied by the first SSB.

In a possible example, when a subcarrier spacing is 30 kHz, an index of a start symbol occupied by the first candidate location is $\{4, 8, 16, 20\}+28*n$, where n=0 or 1; and the processing module is specifically configured to determine that an index of a start symbol occupied by the second candidate location is $\{4, 8, 16, 20\}+28*n+14$, where n=2 or 3; determine that an index of a start symbol occupied by the second candidate location is $\{4, 8, 16, 20\}+28*n-14$, where n=3 or 4; or determine that an index of a start symbol occupied by the second candidate location is $\{4, 8, 16, 20\}+28*n$, where n=2 or 3.

In a possible example, when a subcarrier spacing is 30 kHz, an index of a start symbol occupied by the first candidate location is $\{2, 8\}+14*n$, where n=0, 1, 2, or 3; and the processing module is specifically configured to determine that an index of a start symbol occupied by the second candidate location is $\{2, 8\}+14*n$, where n=5, 6, 7, or 8; or determine that an index of a start symbol occupied by the second candidate location is $\{2, 8\}+14*n$, where n=4, 5, 6, or 7.

In a possible example, when a subcarrier spacing is 30 kHz, an index of a start symbol occupied by the first candidate location is $\{4, 16\}+28*n$, where n=0 or 1, and the index is $\{4, 16\}+28*m+14$, where m=2 or 3; and the processing module is specifically configured to determine that an index of a start symbol occupied by the second candidate location is $\{8, 20\}+28*n$, where n=0 or 1, and the index is $\{8, 20\}+28*m+14$, where m=2 or 3.

In a possible example, when a subcarrier spacing is 30 kHz, an index of a start symbol occupied by the first candidate location is $\{4, 16\}+28*n$, where n=0, 1, 2, or 3; and the processing module is specifically configured to determine that an index of a start symbol occupied by the second candidate location is $\{8, 20\}+28*n$, where n=0, 1, 2, or 3.

In a possible example, when a subcarrier spacing is 30 kHz, an index of a start symbol occupied by the first candidate location is $2+14*n$, where n=0, 1, 2, 3, 5, 6, 7, or 8; and the processing module is specifically configured to determine that an index of a start symbol occupied by the second candidate location is $8+14*n$, where n=0, 1, 2, 3, 5, 6, 7, or 8.

In a possible example, when a subcarrier spacing is 30 kHz, an index of a start symbol occupied by the first candidate location is $2+14*n$, where n=0, 1, 2, 3, 4, 5, 6, or 7; and the processing module is specifically configured to determine that an index of a start symbol occupied by the second candidate location is 8+14*n, where n=0, 1, 2, 3, 4, 5, 6, or 7.

In a possible example, there is a correspondence between the first SSB and the second SSB.

In a possible example, there is a frequency domain offset between the second SSB and the first SSB, and the first SSB is located in a synchronization raster.

In a possible example, there is a frequency domain offset between a composition signal of the second SSB and a composition signal of the first SSB, and the composition signal includes a primary synchronization signal PSS and/or a secondary synchronization signal SSS.

In a possible example, a PSS sequence of the second SSB is different from a PSS sequence of the first SSB, or the second SSB does not include a PSS.

According to a fifth aspect, an embodiment of this application provides an apparatus. The apparatus includes a communication interface and a processor. The communication interface is used by the apparatus to communicate with another device, for example, to send and receive data or a signal. For example, the communication interface may be a transceiver, a circuit, a bus, a module, or a communication interface of another type, and the another device may be a network device. The processor is configured to invoke a group of programs, instructions, or data to perform the method described in the first aspect. The apparatus may further include a memory, configured to store the program, the instructions, or the data invoked by the processor. The memory is coupled to the processor, and the processor may implement the method described in the first aspect when executing the instructions or the data stored in the memory.

For example, the processor is configured to: obtain, through detection by using the communication interface, a first synchronization signal block SSB at a first candidate location.

The processor is further configured to: determine a second candidate location based on the first candidate location, and obtain, through detection, a second SSB at the second candidate location, where there is a correspondence between the first candidate location and the second candidate location.

The processor is further configured to perform PBCH detection or RSRP measurement based on the first SSB and/or the second SSB.

According to a sixth aspect, an embodiment of this application provides an apparatus. The apparatus includes a communication interface and a processor. The communication interface is used by the apparatus to communicate with another device, for example, to send and receive data or a signal. For example, the communication interface may be a transceiver, a circuit, a bus, a module, or a communication interface of another type, and the another device may be a terminal. The processor is configured to invoke a group of programs, instructions, or data to perform the method described in the second aspect. The apparatus may further include a memory, configured to store the program, the instructions, or the data invoked by the processor. The memory is coupled to the processor, and the processor may implement the method described in the second aspect when executing the instructions or the data stored in the memory.

For example, the communication interface is configured to send a first SSB at a first candidate location.

The processor is configured to determine a second candidate location based on a correspondence between the first candidate location and the second candidate location.

The communication interface is further configured to send a second SSB at the second candidate location.

According to a seventh aspect, an embodiment of this application further provides a communication apparatus. The communication apparatus includes a processor, a transceiver, a memory, and computer-executable instructions that are stored in the memory and that can be run on the processor. When the computer-executable instructions are run, the communication apparatus is enabled to perform the method in any one of the first aspect or the possible implementations of the first aspect.

According to an eighth aspect, an embodiment of this application further provides a communication apparatus. The communication apparatus includes a processor, a transceiver, a memory, and computer-executable instructions that are stored in the memory and that can be run on the processor. When the computer-executable instructions are run, the communication apparatus is enabled to perform the method in any one of the second aspect or the possible implementations of the second aspect.

According to a ninth aspect, an embodiment of this application further provides a computer-readable storage medium, where the computer storage medium stores computer-readable instructions; and when the computer-readable instructions are run on a computer, the computer is enabled to perform the method in any one of the first aspect or the possible implementations of the first aspect.

According to a tenth aspect, an embodiment of this application further provides a computer-readable storage medium, including instructions. When the instructions are run on a computer, the computer is enabled to perform the method in any one of the second aspect or the possible implementations of the second aspect.

According to an eleventh aspect, an embodiment of this application provides a chip system. The chip system includes a processor, and may further include a memory, configured to implement the method in any one of the first aspect or the possible implementations of the first aspect. The chip system may include a chip, or may include a chip and another discrete component.

Optionally, the chip system further includes a transceiver. The transceiver is configured to: obtain, through detection, a first synchronization signal block SSB at a first candidate location.

The processor is configured to: determine a second candidate location based on the first candidate location, and obtain, through detection, a second SSB at the second candidate location, where there is a correspondence between the first candidate location and the second candidate location.

The transceiver is configured to perform PBCH detection or RSRP measurement based on the first SSB and/or the second SSB.

According to a twelfth aspect, an embodiment of this application provides a chip system. The chip system includes a processor, and may further include a memory, configured to implement the method in any one of the second aspect or the possible implementations of the second aspect. The chip system may include a chip, or may include a chip and another discrete component.

Optionally, the chip system further includes a transceiver. For example, the transceiver is configured to send a first SSB at a first candidate location.

The processor is configured to determine a second candidate location based on a correspondence between the first candidate location and the second candidate location.

The transceiver is configured to send a second SSB at the second candidate location.

According to a thirteenth aspect, an embodiment of this application further provides a computer program product, including instructions. When the instructions are run on a computer, the computer is enabled to perform the method in any one of the first aspect or the possible implementations of the first aspect, or perform the method in any one of the second aspect or the possible implementations of the second aspect.

According to a fourteenth aspect, an embodiment of this application provides a system. The system includes the apparatus provided in the third aspect or the fifth aspect and the apparatus provided in the fourth aspect or the sixth aspect.

BRIEF DESCRIPTION OF THE DRAWINGS

To describe technical solutions in embodiments of this application or in a conventional technology more clearly, the following briefly describes the accompanying drawings used in describing embodiments.

FIG. 2 is a schematic diagram of a structure of an SSB according to an embodiment of this application;

FIG. 3H is a diagram of another correspondence between a first candidate location and a second candidate location according to an embodiment of this application;

FIG. 3I is a diagram of a correspondence between an index of a first SSB and an index of a second SSB according to an embodiment of this application;

DETAILED DESCRIPTION OF ILLUSTRATIVE EMBODIMENTS

The following describes technical solutions in embodiments of this application with reference to the accompanying drawings in embodiments of this application.

In the specification, claims, and accompanying drawings of this application, the terms "first", "second", "third", "fourth", and the like are intended to distinguish between different objects but do not indicate a particular order. In addition, the terms "including", "having", or any other variant thereof are intended to cover a non-exclusive inclusion. For example, a process, a method, a system, a product, or a device that includes a series of steps or units is not limited to the listed steps or units, but optionally further includes unlisted steps or units, or optionally further includes other inherent steps or units of the process, the method, the product, or the device.

An "embodiment" mentioned in this specification means that a particular feature, structure, or characteristic described with reference to this embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

"A plurality of" means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
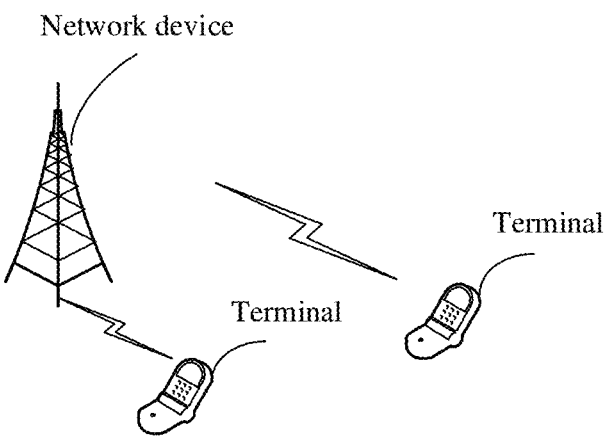
FIG. 1 is a frame diagram of a communication system according to an embodiment of this application.

A communication system in embodiments of this application is first described. FIG. 1 is a frame diagram of a communication system according to an embodiment of this application. A communication method provided in this application is applicable to the communication system shown in FIG. 1, for example, an LTE system or an NR system, or may be another future communication system. This is not limited herein. As shown in FIG. 1, the communication system includes a network device and a terminal device.

The method in embodiments of this application may be performed by a communication apparatus. The communication apparatus may be located in a base station, for example, may be a processing chip in the base station. Alternatively, the communication apparatus may be located in a terminal, for example, may be a processing chip in the terminal.

The network device may be a base station or an access point, or may be a device that is in an access network and that communicates with a wireless terminal over an air interface through one or more sectors. The base station may be configured to mutually convert a received over-the-air frame and an IP packet and serve as a router between the wireless terminal and a rest part of the access network, where the rest part of the access network may include an internet protocol (IP) network. The base station may further coordinate attribute management of the air interface. For example, the base station may be a base transceiver station (BTS) in a global system for mobile communications (GSM) or code division multiple access (CDMA), a NodeB (NB) in wideband code division multiple access (WCDMA), an evolved NodeB (eNB or eNodeB) in long term evolution (LTE), a relay station or an access point, a gNodeB (gNB)

in a 5G network, or an integrated access and backhaul (IAB) node. This is not limited herein.

The terminal in embodiments of this application is an entity that is on a user side and that is configured to receive or transmit a signal. The terminal may be a device that provides a user with voice and/or data connectivity, for example, a handheld device with a wireless connection function, or a processing device connected to a wireless modem. The terminal device may communicate with a core network via a radio access network (RAN), and exchange a voice and/or data with the RAN. The terminal device may include user equipment (UE), a wireless terminal device, a mobile terminal device, a device-to-device (D2D) communication terminal device, a vehicle-to-everything (V2X) terminal device, a machine-to-machine/machine-type communication (M2M/MTC) terminal device, an internet of things (IoT) terminal device, a subscriber unit, a subscriber station, a mobile station, a remote station, an access point, a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device may be a device such as a personal communications service (PCS) phone, a cordless telephone set, a session initiation protocol (SIP) phone, a wireless local loop (WLL) station, or a personal digital assistant (PDA). The terminal device further includes a limited device, for example, a device having low power consumption, a device having a limited storage capability, or a device having a limited computing capability. For example, the terminal device includes an information sensing device, for example, a barcode, radio frequency identification (RFID), a sensor, a global positioning system (GPS), or a laser scanner.

By way of example but not limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on a body or integrated into clothes or an accessory of a user. The wearable device is more than a hardware device, and implements powerful functions through software support, data exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

If the various terminals described above are located in a vehicle (for example, placed in the vehicle or installed in the vehicle), the terminals may be all considered as vehicle-mounted terminal devices. For example, the vehicle-mounted terminal device is also referred to as an on-board unit (OBU).

In NR, a primary synchronization signal (PSS), a secondary synchronization signal (SSS), and a physical broadcast channel (PBCH) form a synchronization signal/broadcast channel block (SS/PBCH block). The synchronization signal/broadcast signal block is sometimes referred to as a synchronization signal block (SSB) for short.

Figure 2:
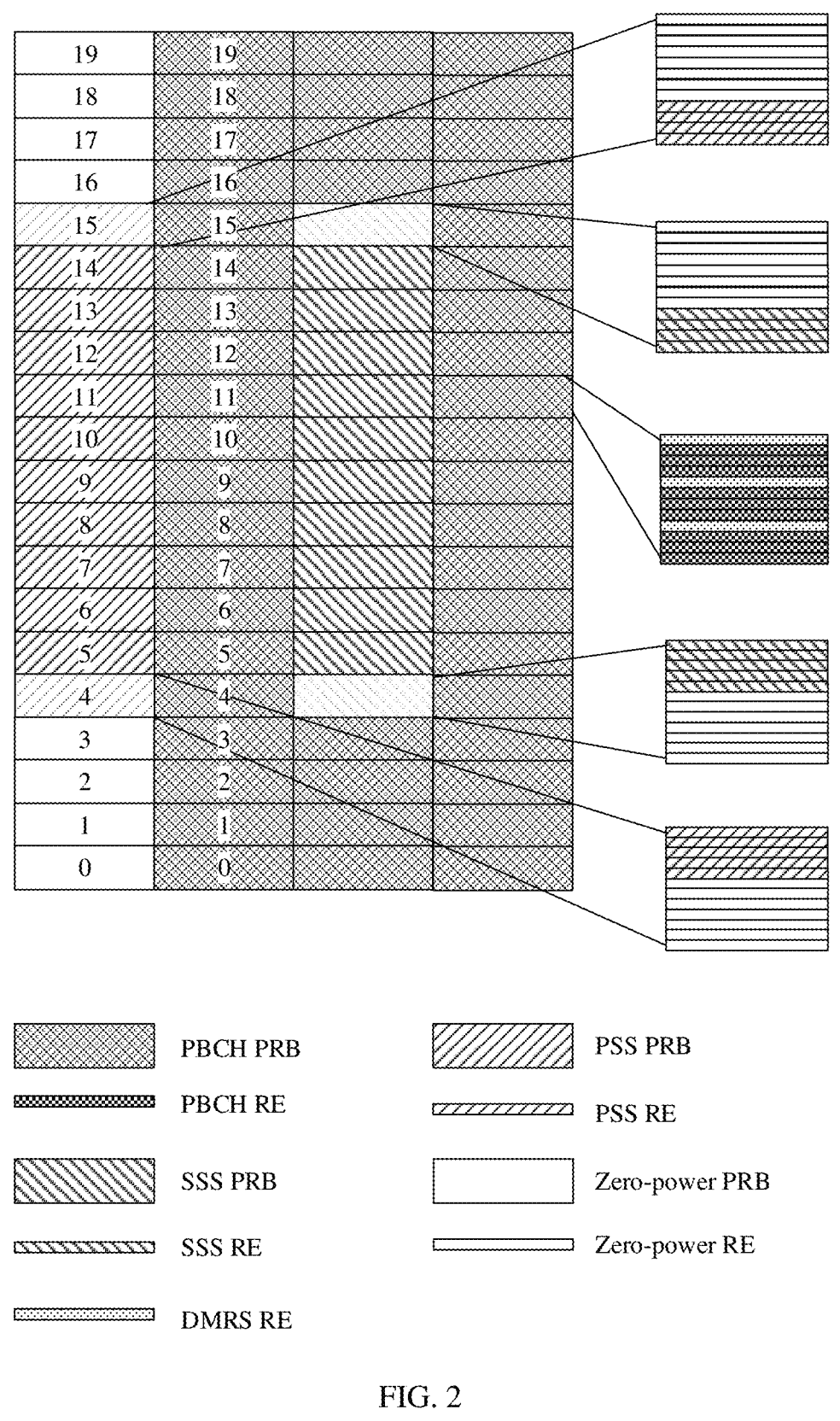

FIG. 2 is a schematic diagram of a structure of an SSB according to an embodiment of this application. As shown in FIG. 2, in NR, the SSB occupies 20 physical resource blocks (PRBs) in frequency domain, and occupies four orthogonal frequency division multiplexing (OFDM) symbols in time domain. In NR, each PRB includes 12 resource elements (REs). In NR, a PSS sequence length and an SSS sequence length each are 127. A PSS is mapped to the $1^{st}$ OFDM symbol of the SSB. Among the 20 PRBs (240 REs), the PSS occupies 127 REs, and the remaining REs are zero-power REs. An SSS is mapped to the $3^{rd}$ OFDM symbol of the SSB, and also occupies 127 REs, and an RE that is not occupied by the SSS on the symbol is a zero-power RE or a PBCH. A specific arrangement is shown in FIG. 2. The PBCH occupies 48 PRBs in total, including 20 PRBs on the $2^{nd}$ symbol, 20 PRBs on the symbol, and eight PRBs on the $3^{rd}$ $4^{th}$ symbol.

A terminal implements downlink time-frequency domain coarse synchronization by using the SSB, and obtains a part of cell information, including a cell physical identity (ID), a radio frame number, a demodulation reference signal (DMRS) time domain location, a common subcarrier spacing (SCS), a control-resource set (CORESET) and a search space configuration of a system information block (SIB)-physical downlink control channel (PDCCH), and the like. After obtaining the foregoing basic information, the terminal may perform a subsequent initial access process, for example, receive a SIB 1.

In NR, the SSB may be sent in a beam sweeping manner. An NR base station sends a plurality of SSBs in one periodicity. Each SSB covers a specific area, and the SSB is sent at an SSB candidate location defined in the protocol. In a conventional technology, an increase of a communication carrier frequency leads to an increase of a path loss. Therefore, larger array coverage is required. With an increasing quantity of base station arrays, the SSB may hinder downlink coverage.

Figure 3A:
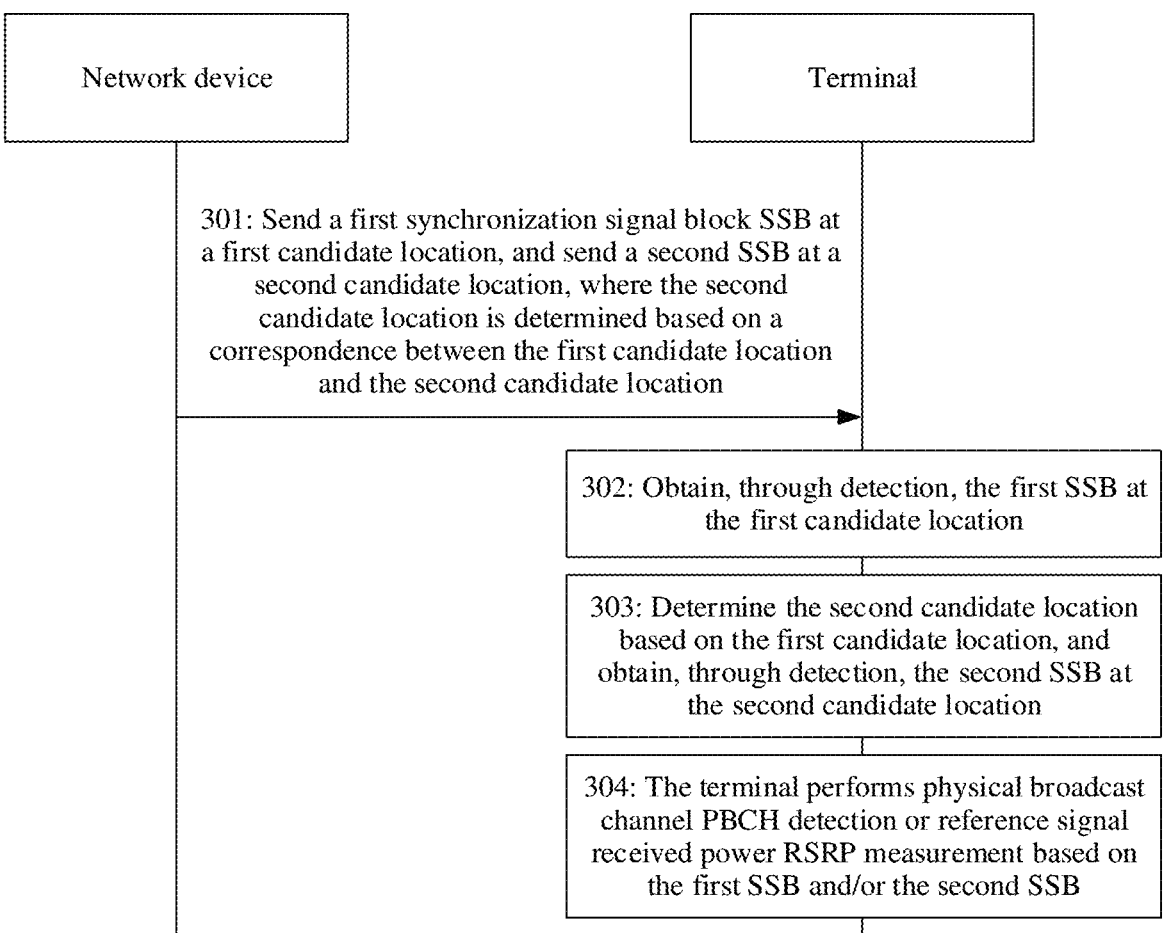
FIG. 3A is a flowchart of a synchronization signal transmission method according to an embodiment of this application.

Based on the problem described in the background, FIG. 3A is a flowchart of a synchronization signal transmission method according to an embodiment of this application. As shown in FIG. 3A, the method includes the following steps.

301: A network device sends a first synchronization signal block SSB at a first candidate location, and sends a second SSB at a second candidate location, where the second candidate location is determined based on a correspondence between the first candidate location and the second candidate location.

302: A terminal obtains, through detection, the first SSB at the first candidate location.

303: The terminal determines the second candidate location based on the first candidate location, and obtains, through detection, the second SSB at the second candidate location.

304: The terminal performs physical broadcast channel PBCH detection or reference signal received power RSRP measurement based on the first SSB and/or the second SSB.

The network device sends an SSB to the terminal at a candidate location, and the terminal performs blind detection based on a candidate location specified in the protocol or agreed on in another preset condition, to obtain the SSB. The candidate location indicates a symbol location occupied by one SSB in time domain when the SSB is sent. Usually, a quantity of symbols occupied by the SSB is greater than 1. Therefore, when each SSB is sent, a quantity of time domain symbols occupied by the candidate location is greater than 1. In a conventional technology, the network device sends the first SSB at the first candidate location, and the SSB candidate location is in one half-frame (5 ms). Quantities of SSB candidate locations in the half-frame are different in different frequency bands. Specifically, in a frequency band less than 3 GHz, the quantity of SSB candidate locations in the half-frame is 4. In a frequency band greater than 3 GHz and in an FR1 frequency band, the quantity of SSB candidate locations in the half-frame is 8. In an FR2 frequency band, the quantity of SSB candidate locations in the half-frame is 64. Sending of the first SSB specifically includes the following five cases.

Case A: For a 15 kHz subcarrier spacing, sending is performed based on $\{2, 8\}+14*n$, where $\{2, 8\}+14*n$ indicates an index of the 1st symbol occupied by an SS block/a PBCH block, namely, an index of a start symbol occupied by a candidate location in a half-frame. The following is the same, and details are not described again. For a frequency band less than 3 GHz or equal to 3 GHz, n=0 or 1; for a frequency band greater than 3 GHz and in an FR1 frequency band, n=0, 1, 2, or 3. Locations occupied by the SS/PBCH block in one synchronization signal periodicity are obtained by traversing the foregoing values of n in the foregoing formula. The following is the same, and details are not described again.

Case B: For a 30 kHz subcarrier spacing, sending is performed based on $\{4, 8, 16, 20\}+28*n$. For a frequency band less than 3 GHz or equal to 3 GHz, n=0; for a frequency band greater than 3 GHz and in an FR1 frequency band, n=0 or 1.

Case C: For a 30 kHz subcarrier spacing, sending is performed based on $\{2, 8\}+14*n$. For a frequency band less than 3 GHz or equal to 3 GHz, n=0 or 1; for a frequency band greater than 3 GHz and in an FR1 frequency band, n=0, 1, 2, or 3.

Case D: For a 120 kHz subcarrier spacing, sending is performed based on $\{4, 8, 16, 20\}+28*n$. For an FR2 frequency band, n=0, 1, 2, 3, 5, 6, 7, 8, 10, 11, 12, 13, 15, 16, 17, or 18.

Case E: For a 240 kHz subcarrier spacing, an SSB is sent based on $\{8, 12, 16, 20, 32, 36, 40, 44\}+56*n$. For an FR2 frequency band, n=0, 1, 2, 3, 5, 6, 7, or 8.

It should be understood that, the foregoing five cases describe candidate locations for sending or measuring the SSB in the half-frame when subcarrier spacings are different, and the candidate location is a time domain location in the half-frame, for example, a symbol index. However, during actual implementation, a quantity of SSBs sent by the network device in the half-frame may be less than a quantity of SSB candidate locations.

The SSB sent by the network device is periodically repeated, and a periodicity value is configurable. For an SSB used for terminal access, a typical value of a periodicity is 20 milliseconds (ms).

A directional beam including an array antenna may obtain a significant power gain. Therefore, the network device may send the SSB at different SSB candidate locations by using beams in different directions, so that a received power on a terminal side can be increased.

Figure 3B:
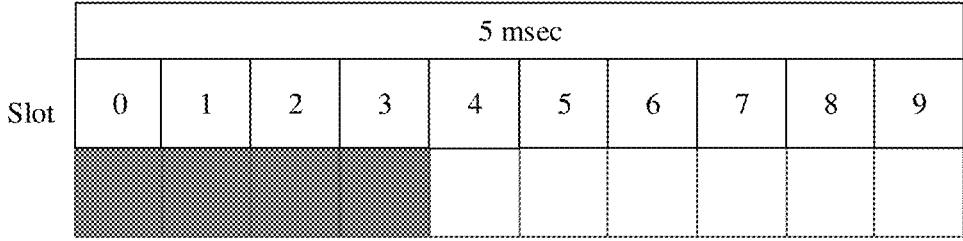
FIG. 3B is a schematic diagram of an SSB slot location according to an embodiment of this application.
Figure 3C:
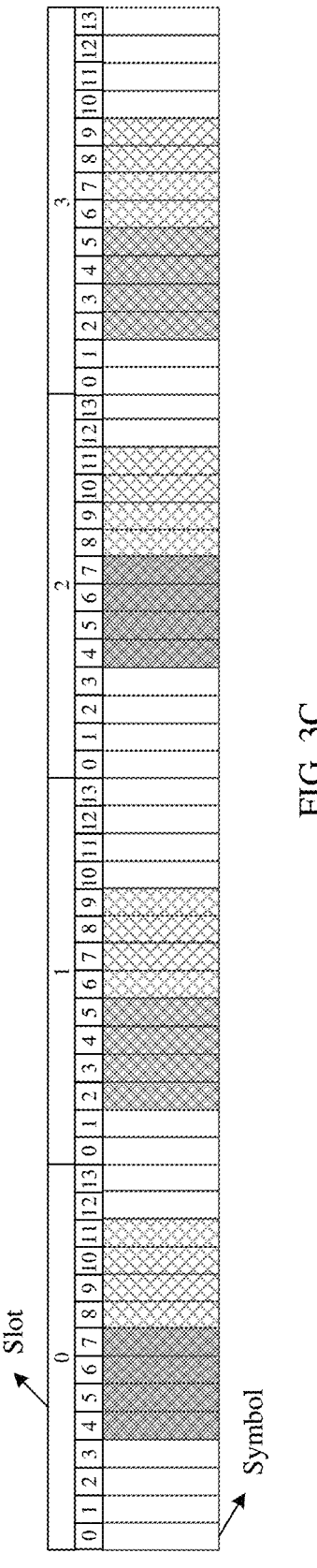
FIG. 3C is a schematic diagram of a candidate location of an original SSB.

The following describes the SSB candidate location by using an example in which the subcarrier spacing is 30 kHz and an occupied frequency band is in FR1. FIG. 3B is a schematic diagram of an SSB slot location according to an embodiment of this application. As shown in FIG. 3B, when an SCS is 30 kHz, in an FR1 frequency band, each half-frame includes eight SSB candidate locations. Specifically, in 10 slots in 5 milliseconds (msec) (half-frame), Each of the first four slots (whose slot indexes are 0, 1, 2, and 3) includes two SSB candidate locations. A symbol occupation status of the SSB candidate locations in each slot may correspond to the status in the FR1 frequency band in the foregoing described case B and case C. FIG. 3C is a schematic diagram of a candidate location of an original SSB. Corresponding to the scenario of the foregoing case B, an index of a start symbol occupied by an SSB candidate location in each half-frame may be represented as $\{4, 8, 16, 20\}+28*n$, where n=0 or 1. Currently, the described SSB and candidate location thereof have been proposed. Therefore, the corresponding SSB is described as an original SSB, and the corresponding candidate location is a candidate location of the original SSB. When n=0, the index of the start symbol occupied by the candidate location of the original SSB is 4, 8, 16, or 20; when n=1, the index of the start symbol of occupied by the candidate location of the original SSB is 32, 36, 44, or 48. Because each slot occupies 14 symbols, when the index of the start symbol occupied by the candidate location of the original SSB is 4, for a corresponding slot, a formula 4/14=0 . . . 4 is met, to be specific, the start symbol corresponds to a location whose symbol index is 4 in a slot whose index is 0 (where FIG. 3C shows four OFDM symbols including the start symbol that are occupied by the candidate location, the four symbols are used to send one SSB, and the following figures are the same). In a same method, a location of a start symbol occupied by a candidate location of another original SSB in a corresponding slot may be obtained, where the location is (0, 8), (1, 2), (1, 6), (2, 4), (2, 8), (3, 2), or (3, 6). The former number in the bracket indicates a slot index corresponding to the SSB candidate location, and the latter number indicates a symbol index corresponding to the start symbol occupied by the SSB candidate location in the corresponding slot (where meanings of data in the following brackets are the same). Details are shown in FIG. 3C.

Figure 3D:
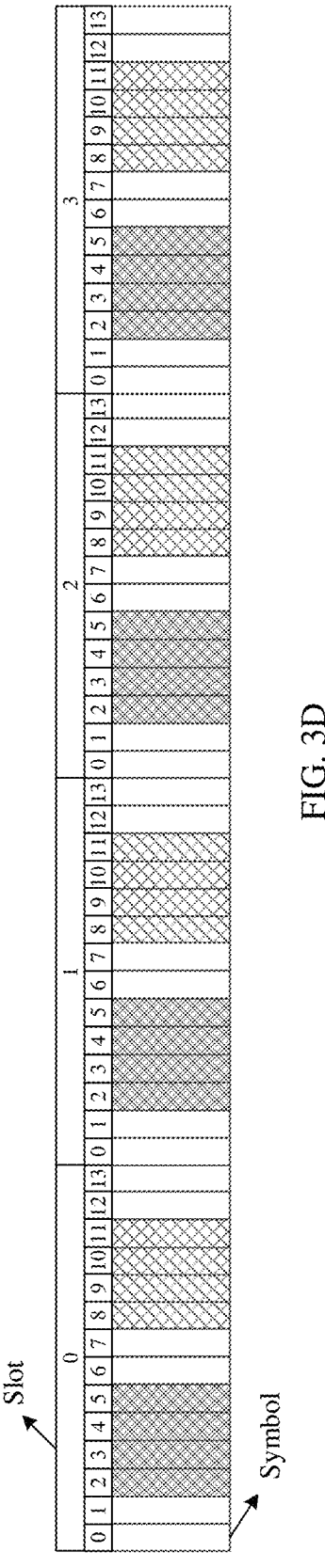
FIG. 3D is a schematic diagram of a candidate location of another original SSB according to an embodiment of this application.

Corresponding to the scenario of the foregoing case C in which an occupied frequency band is in FR1, FIG. 3D is a schematic diagram of a candidate location of another original SSB according to an embodiment of this application. A start symbol occupied by the candidate location of the original SSB in each half-frame may be represented as $\{2, 8\}+14*n$, where n=0, 1, 2, or 3, and a corresponding index of the start symbol occupied by the candidate location of the original SSB is 2, 8, 16, 22, 30, 36, 44, or 50. As shown in FIG. 3D, a location of the start symbol occupied by the candidate location of the original SSB in a corresponding slot is (0, 2), (0, 8), (1, 2), (1, 8), (2, 2), (2, 8), (3, 2), or (3, 8).

To enhance an SSB coverage capability, in this embodiment, more SSB candidate locations are introduced in a same periodicity to send a newly added SSB, where the locations are candidate locations occupied by the newly added SSB. In this embodiment of this application, the original SSB is referred to as a first SSB, the candidate location corresponding to the original SSB is a first candidate location, the newly added SSB is referred to as a second SSB, and the candidate location corresponding to the newly added SSB is a second candidate location. To facilitate continuous sending of a network device or blind detection of a terminal, there may be a correspondence between the first candidate location and the second candidate location.

Optionally, the correspondence is a correspondence between slot locations and/or symbol locations occupied by the first candidate location and the second candidate location in one data half-frame. It should be noted that, in a possible implementation, the correspondence is a correspondence between symbol locations occupied by the first candidate location and the second candidate location in one data half-frame. The terminal or the network device may determine, based on the symbol location correspondence, a correspondence between slot locations occupied by the first candidate location and the second candidate location in one data half-frame. The terminal or the network device determines the second candidate location based on the first candidate location, and the slot location correspondence and the symbol location correspondence of the first candidate location and the second candidate location. In another possible implementation, the correspondence may be a correspondence between slot locations occupied by the first candidate location and the second candidate location in one data half-frame. The terminal or the network device may determine, based on the slot location correspondence, a correspondence between symbol locations occupied by the first candidate location and the second candidate location in one data half-frame. The terminal or the network device determines the second candidate location based on the first candidate location, the correspondence between the slot locations occupied by the first candidate location and the second candidate location in one data half-frame, and the correspondence between the symbol locations occupied by the first candidate location and the second candidate location in one data half-frame. In another possible implementation, the correspondence includes a correspondence between slot locations occupied by the first candidate location and the second candidate location in one data half-frame and a correspondence between symbol locations occupied by the first candidate location and the second candidate location in one data half-frame. The terminal or the network device determines the second candidate location based on the first candidate location, the correspondence between the slot locations occupied by the first candidate location and the second candidate location in one data half-frame, and the correspondence between the symbol locations occupied by the first candidate location and the second candidate location in one data half-frame.

Content of the foregoing correspondence is not limited in this application, and may be determined based on an actual implementation. The correspondences described in the following all include the foregoing three possible cases, and details are not described in the following.

Specifically, the first candidate location and the second candidate location may be in a same half-frame, namely, in same 5 ms. The first candidate location and the second candidate location may be in one-to-one correspondence or may be in one-to-many correspondence in one data half-frame. To be specific, one candidate location occupied by the second SSB may be determined based on one candidate location occupied by the first SSB; or a plurality of candidate locations occupied by the second SSB may be determined based on one candidate location occupied by the first SSB.

Optionally, the correspondence between the slot locations and/or the symbol locations occupied by the first candidate location and the second candidate location in one data half-frame includes locations with a same symbol index that are occupied by the first candidate location and the second candidate location in slots with a fixed interval. It should be noted that, the correspondence includes the slot location correspondence, the symbol location correspondence, or the slot location correspondence and the symbol location correspondence. Content included in the preset, protocol-defined, or configured correspondence between the first candidate location and the second candidate location is not limited in this application, provided that the terminal or the network device can obtain the foregoing information included in the correspondence.

Figure 3E:
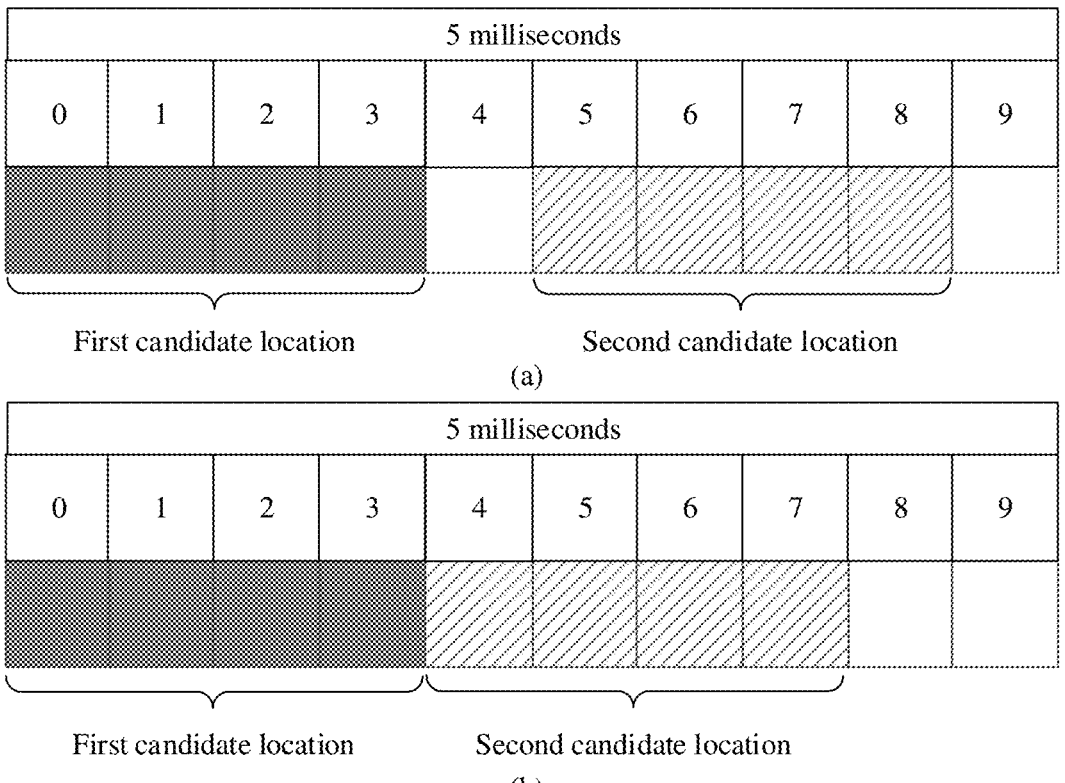
FIG. 3E is a diagram of a correspondence between a first candidate location and a second candidate location according to an embodiment of this application.

FIG. 3E is a diagram of a correspondence between a first candidate location and a second candidate location according to an embodiment of this application. As shown in (a) in FIG. 3E, that an SCS is 30 kHz is used as an example. The first candidate location is in slots whose index values are 0, 1, 2, and 3 in one half-frame, and each slot includes two candidate locations. In this case, the second candidate location may be in slots whose index values are 5, 6, 7, and 8 in the half-frame, and each slot includes two candidate locations. The $1^{st}$ first candidate location in the slot whose index is 0 corresponds to the $1^{st}$ second candidate location in the slot whose index is 5, and the $2^{nd}$ first candidate location in the slot whose index is 0 corresponds to the $2^{nd}$ second candidate location in the slot whose index is 5. By analogy, a one-to-one correspondence between eight first candidate locations and eight second candidate locations is formed. In this way, a condition that a quantity of slots occupied by a downlink signal to a quantity of slots occupied by an uplink signal in a TDD mode is 4:1 can be met.

Alternatively, as shown in (b) in FIG. 3E, the first candidate location is in slots whose index values are 0, 1, 2, and 3 in one half-frame, and the second candidate location may be in slots whose index values are 4, 5, 6, and 7 in the half-frame. The $1^{st}$ first candidate location in the slot whose index is 0 corresponds to the $1^{st}$ second candidate location in the slot whose index is 4, and the $2^{nd}$ first candidate location in the slot whose index is 0 corresponds to the $2^{nd}$ second candidate location in the slot whose index is 4. By analogy, a one-to-one correspondence between eight first candidate locations and eight second candidate locations is formed. In this way, a condition that a quantity of slots occupied by a downlink signal to a quantity of slots occupied by an uplink signal in a TDD mode is 8:2 can be met.

Figure 3F:
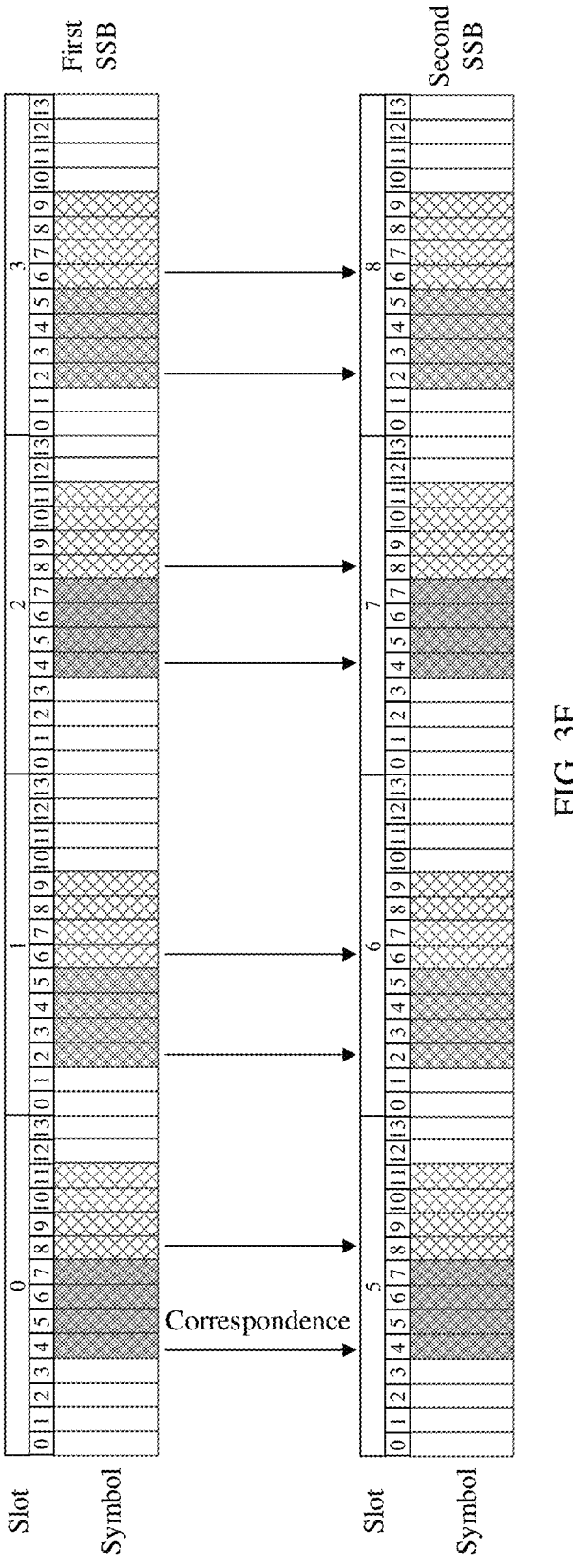
FIG. 3F is a diagram of a specific correspondence between a first candidate location and a second candidate location according to an embodiment of this application.

The second candidate location and the first candidate location may only occupy different slots, and symbol locations occupied in the slots completely correspond to each other. For example, corresponding to the foregoing case B, locations of start symbols occupied by the first candidate location in corresponding slots are (0, 4), (0, 8), (1, 2), (1, 6), (2, 4), (2, 8), (3, 2), and (3, 6). The second candidate location may occupy locations with totally same indexes as those of the start symbols occupied by the first candidate location in slots 5, 6, 7, and 8, where the locations are (5, 4), (5, 8), (6, 2), (6, 6), (7, 4), (7, 8), (8, 2), and (8, 6). A correspondence between the two types of locations is shown in FIG. 3F. FIG. 3F is a diagram of a specific correspondence between a first candidate location and a second candidate location according to an embodiment of this application. An arrow points to a first candidate location and a second candidate location that correspond to each other. Further, an index of a start symbol occupied by the second candidate location may be correspondingly represented as {4, 8, 16, 20}+28*n+14, where n=2 or 3, or represented as {4, 8, 16, 20}+28*n−14, where n=3 or 4.

Alternatively, corresponding to the foregoing case B, the second candidate location may occupy locations with totally same indexes as those of start symbols occupied by the first candidate location in slots 4, 5, 6, and 7, where the locations are specifically (4, 4), (4, 8), (5, 2), (5, 6), (6, 4), (6, 8), (7, 2), and (7, 6). An index of a start symbol occupied by the second candidate location may be correspondingly represented as {4, 8, 16, 20}+28*n, where n=2 or 3.

Figure 3G:
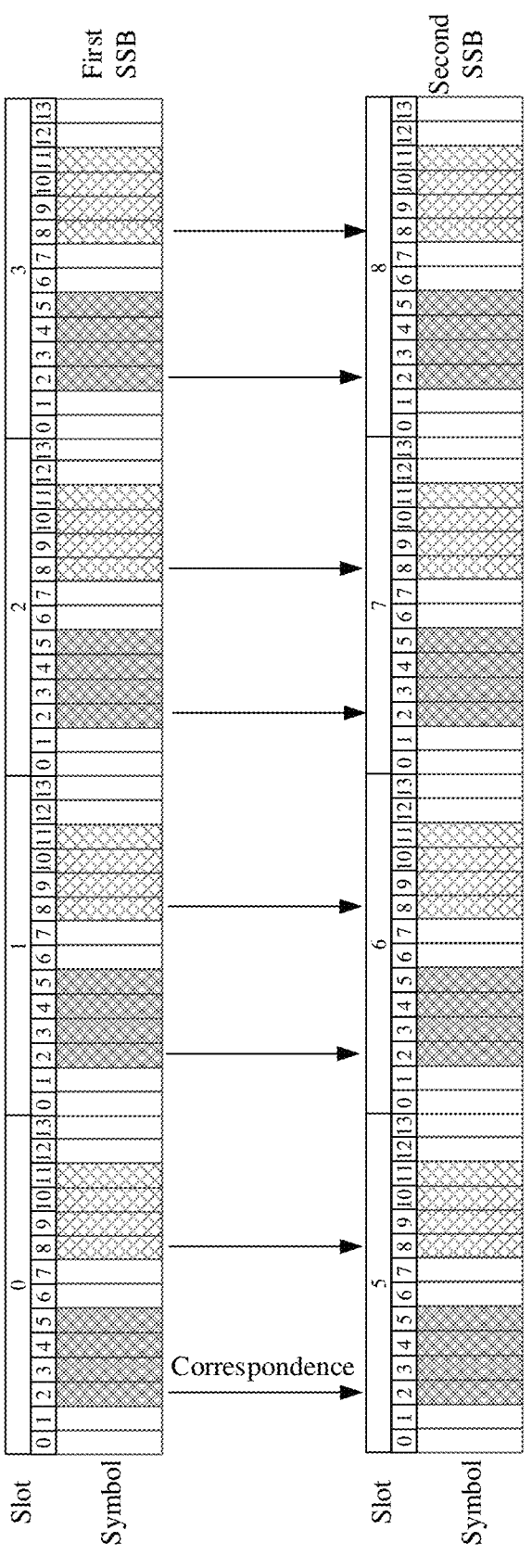
FIG. 3G is a diagram of another specific correspondence between a first candidate location and a second candidate location according to an embodiment of this application.

Corresponding to the foregoing case C, locations of start symbols occupied by the first candidate location in corresponding slots are (0, 2), (0, 8), (1, 2), (1, 8), (2, 2), (2, 8), (3, 2), and (3, 8). The second candidate location may occupy locations with totally same indexes as those of the start symbols occupied by the first candidate location in slots 5, 6, 7, and 8, where the locations are (5, 2), (5, 8), (6, 2), (6, 8), (7, 2), (7, 8), (8, 2), and (8, 8). A correspondence between the two types of locations is shown in FIG. 3G. FIG. 3G is a diagram of another specific correspondence between a first candidate location and a second candidate location according to an embodiment of this application. An arrow points to a first candidate location and a second candidate location that correspond to each other. Further, an index of a start symbol occupied by the second candidate location may be represented as {2, 8}+14*n, where n=5, 6, 7, or 8.

Alternatively, corresponding to the foregoing case C, the second candidate location may occupy locations with totally same indexes as those of start symbols occupied by the first candidate location in slots 4, 5, 6, and 7, where the locations are (4, 2), (4, 8), (5, 2), (5, 8), (6, 2), (6, 8), (7, 2), and (7, 8). An index of a start symbol occupied by the second candidate location may be represented as {2, 8}+14*n, where n=4, 5, 6, or 7.

In the foregoing cases, one second candidate location corresponding to one first candidate location is determined based on the first candidate location. Optionally, a plurality of second candidate locations corresponding to one first candidate location may be determined based on the first candidate location.

For example, when an SCS is 60 kHz, a quantity of slots included in 5 msec is 20, to be specific, slot indexes range from 0 to 19. The first candidate location and the second candidate location may each occupy different time domain locations. First, it is assumed that the first candidate location and the second candidate location each occupy four slots. In this case, the slots occupied by the first candidate location may be 0, 1, 2, and 3, and the slots occupied by the second candidate location may be 5, 6, 7, and 8, or 4, 5, 6, and 7. It is assumed that the first candidate location and the second candidate location each occupy eight slots. In this case, the slots occupied by the first candidate location may be 0, 1, 2, 3, 4, 5, 6, and 7, and the slots occupied by the second candidate location may be 10, 11, 12, 13, 14, 15, 16, and 17, or 8, 9, 10, 11, 12, 13, 14, and 15. The first candidate location and the second candidate location are in one-to-one correspondence. Alternatively, it is assumed that the first candidate location occupies four slots, and the second candidate location occupies eight slots. In this case, the slots occupied by the first candidate location may be 0, 1, 2, and 3, and the slots occupied by the second candidate location may be 4, 5, 6, 7, 8, 9, 10, and 11. The first candidate location in the slots 0, 1, 2, and 3 corresponds to the second candidate location in the slots 4, 5, 6, and 7, and corresponds to the second candidate location in the slots 8, 9, 10, and 11. The first candidate location and the second candidate location are in one-to-many correspondence. One 60 kHz slot may include two or three SSB candidate locations. Symbols of the SSB candidate locations are not limited in this application.

It can be learned that in this embodiment of this application, a network device sets, based on a candidate location of an original SSB, a candidate location of a newly added SSB corresponding to the candidate location of the original SSB in a slot and a symbol. In addition, candidate locations of newly added SSBs are locations with a same symbol index in slots with a fixed interval after a group of SSB candidate locations. In this way, the network device may send a group of newly added SSBs after completing sending of a group of original SSBs. This resolves a synchronization signal coverage problem and improves flexibility of sending the newly added SSB.

In the foregoing embodiment, the candidate location of the newly added SSB corresponding to the candidate location of the original SSB is determined based on the candidate location of the original SSB, and then the corresponding SSBs are sent at the two candidate locations, to achieve an effect of enhancing SSB coverage. Optionally, candidate locations of two different SSBs may be placed consecutively in a same slot, to achieve the effect of enhancing SSB coverage. Similarly, the two SSBs are referred to as a first SSB and a second SSB, and there is a correspondence between a first candidate location of the first SSB and a second candidate location of the second SSB. Optionally, a correspondence between slot locations and/or symbol locations includes symbol locations with a fixed interval that are of the first candidate location and the second candidate location in a same slot, and the fixed interval is equal to or greater than a quantity of symbols occupied by the first SSB. It should be noted that, the correspondence includes a slot location correspondence, a symbol location correspondence, or a slot location correspondence and a symbol location correspondence. Content included in the preset, protocol-defined, or configured correspondence is not limited in this application, provided that a terminal or the network device can obtain the foregoing information included in the correspondence.

For details, refer to FIG. 3H. FIG. 3H is a diagram of another correspondence between a first candidate location and a second candidate location according to an embodiment of this application. As shown in (a) in FIG. 3H, a case in which an SCS is 30 kHz and a frequency band is FR1 is used as an example. An SSB is sent when a condition that a quantity of slots occupied by a downlink signal to a quantity of slots occupied by an uplink signal is 4:1 in a TDD mode is met. Eight first candidate locations occupied by a first SSB are respectively in slots whose index values are 0, 1, 2, 3, 5, 6, 7, and 8, and second candidate locations occupied by a second SSB are also in the slots whose index values are 0, 1, 2, 3, 5, 6, 7, and 8 in a half-frame. In (a) in FIG. 3H, gray padding in a slot indicates that the slot includes one first candidate location, and slash padding indicates that the slot includes one second candidate location corresponding to the first candidate location.

Alternatively, as shown in (b) in FIG. 3H, an SSB is sent when a condition that a quantity of slots occupied by a downlink signal to a quantity of slots occupied by an uplink signal is 8:2 in a TDD mode is met. First candidate locations are respectively in slots whose index values are 0, 1, 2, 3, 4, 5, 6, and 7, second candidate locations are also in the slots whose index values are 0, 1, 2, 3, 4, 5, 6, and 7 in a half frame. As shown in (b) in FIG. 3H, gray padding in a slot indicates that the slot includes one first candidate location, and slash padding indicates that the slot includes one second candidate location corresponding to the first candidate location.

Specifically, when the first candidate location and the second candidate location corresponding to the first candidate location are consecutively placed in a same slot, indexes of OFDM symbols occupied by the first candidate location and the second candidate location may also be obtained. It is assumed that, similar to case B, a difference between an index of a start symbol occupied by a candidate location of a previous SSB and an index of a start symbol occupied by a candidate location of a next SSB is four symbols (that is, there is no gap between the candidate location of the previous SSB and the candidate location of the next SSB). When the eight first candidate locations occupied by the first SSB are respectively in the slots whose index values are 0, 1, 2, 3, 5, 6, 7, and 8, an index of a start symbol occupied by the first candidate location may be represented as $\{4, 16\}+28*n$, where n=0 or 1, and the index is $\{4, 16\}+28*m+14$, where m=2 or 3. Specifically, the locations in the corresponding slots are (0, 4), (1, 2), (2, 4), (3, 2), (5, 4), (6, 2), (7, 4), and (8, 2), where the former number in the bracket indicates the slot index corresponding to the first candidate location, and the latter number indicates the index of the start symbol occupied by the first candidate location in the corresponding slot. Correspondingly, the eight second candidate locations occupied by the second SSB are also in the slots whose index values are 0, 1, 2, 3, 5, 6, 7, and 8 and each are after the first candidate location corresponding to the second candidate location. In this case, a difference between the index of the start symbol occupied by the first candidate location and an index of a start symbol occupied by the second candidate location corresponding to the first candidate location is 4. In other words, the index of the start symbol occupied by the second candidate location may be represented by $\{8, 20\}+28*n$, where n=0 or 1, and the index is $\{8, 20\}+28*m+14$, where m=2 or 3. Specifically, the locations in the corresponding slots are (0, 8), (1, 6), (2, 8), (3, 6), (5, 8), (6, 6), (7, 8), and (8, 6). The former number in the bracket indicates the slot index corresponding to the second candidate location, and the latter number indicates the index of the start symbol occupied by the second candidate location in the corresponding slot.

Similarly, when the first candidate locations are in the slots whose index values are 0, 1, 2, 3, 4, 5, 6, and 7, it is assumed that, similar to case B, a difference between each first candidate location and a second candidate location corresponding to the first candidate location is also four symbol indexes. In this case, an index of a start symbol occupied by the first candidate location is represented as $\{4, 16\}+28*n$, where n=0, 1, 2, or 3. Specifically, the locations in the corresponding slots are (0, 4), (1, 2), (2, 4), (3, 2), (4, 4), (5, 2), (6, 4), and (7, 2). An index of a start symbol occupied by the second candidate location may be represented as $\{8, 20\}+28*n$, where n=0, 1, 2, or 3. Specifically, the locations in the corresponding slots are (0, 8), (1, 6), (2, 8), (3, 6), (4, 8), (5, 6), (6, 8), and (7, 6).

It is assumed that, similar to case C, a difference between a candidate location of a previous SSB and a candidate location of a next SSB is 6 symbols (that is, there is an interval of two symbols between the candidate location of the previous SSB and the candidate location of the next SSB). When the eight first candidate locations occupied by the first SSB are respectively in the slots whose index values are 0, 1, 2, 3, 5, 6, 7, and 8, an index of a start symbol occupied by the first candidate location may be represented as $2+14*n$, where n=0, 1, 2, 3, 5, 6, 7, or 8. Specifically, the locations in the corresponding slots are (0, 2), (1, 2), (2, 2), (3, 2), (5, 2), (6, 2), (7, 2), and (8, 2). Correspondingly, the eight second candidate locations occupied by the second SSB are also in the slots whose index values are 0, 1, 2, 3, 5, 6, 7, and 8 and each are after the first candidate location corresponding to the second candidate location. In this case, a difference between an index of a start symbol occupied by each second candidate location and an index of a start symbol occupied by a first candidate location corresponding to the second candidate location is 6 In other words, the index of the start symbol occupied by the second candidate location may be represented as: $8+14*n$, where n=0, 1, 2, 3, 5, 6, 7, or 8. Specifically, the locations in the corresponding slots are (0, 8), (1, 8), (2, 8), (3, 8), (5, 8), (6, 8), (7, 8), and (8, 8).

Similarly, it is assumed that, similar to case C, a difference between a candidate location of a previous SSB and a candidate location of a next SSB is six symbols. When the first candidate locations occupied by the first SSB are in the slots whose index values are 0, 1, 2, 3, 4, 5, 6, and 7, an index of a start symbol occupied by the first candidate location may be represented as $2+14*n$, where n=0, 1, 2, 3, 4, 5, 6, or 7. Correspondingly, the eight second candidate locations are also in the slots whose index values are 0, 1, 2, 3, 4, 5, 6, and 7 and each are after the first candidate location corresponding to the second candidate location. In this case, a difference between an index of a start symbol occupied by each second candidate location and an index of a start symbol occupied by a first candidate location corresponding to the second candidate location is 6. In other words, the index of the start symbol occupied by the second candidate location may be represented as: $8+14*n$, where n=0, 1, 2, 3, 4, 5, 6, or 7.

It can be learned that in this embodiment of this application, a network device sets, based on a first candidate location, a second candidate location mutually corresponding to the first candidate location in a slot and a symbol, and second candidate locations are locations with symbol indexes in a fixed interval and each are after each first candidate location. In this way, the network device may send one second SSB immediately after completing sending of one first SSB. This resolves a synchronization signal coverage problem, reduces a time difference between the first SSB and the second SSB, and ensures channel coherence, so that a terminal can perform joint channel estimation on PBCHs.

After determining the first candidate location and the second candidate location, the network device sends the SSB by using a beam. A candidate location set of the first SSB and a candidate location set of the second SSB together form a larger SSB candidate location set. Optionally, the network device may directly send the SSB by using more beams. In the foregoing example, a quantity of first candidate locations is 8, and a quantity of second candidate locations is also 8. Therefore, there are 16 SSB candidate locations in total. The network device may directly use the 16 SSB candidate locations to send SSBs of different beams. Certainly, a quantity of SSB candidate locations occupied by the network device may alternatively be less than 16, for example, may be 15, 14, or 13.

That the network device uses more beams means that a beam width is narrower. On a line of sight (LOS) channel, the narrower beam width may be directly converted into an array gain. However, on a non-line of sight (NLOS) channel, a narrow beam provides limited gains. To enable a candidate location of a newly added SSB to bring a coverage gain on both the LOS channel and the NLOS channel, in this embodiment, a quasi co-location (QCL) assumption between the newly added SSB and an original SSB is introduced. The newly added SSB is referred to as a supplementary SSB in the following.

It can be learned from the foregoing description that, a first candidate location corresponds to one or more second candidate locations, where the first candidate location is used to send the first SSB, the second candidate location is used to send the second SSB, and there is a QCL relationship between the first SSB and the second SSB. In this case, one or more second SSBs may be associated with one first SSB, or there may be the QCL relationship between one or more second SSBs and one first SSB. Herein, that there is the QCL relationship between the SSBs means that the SSBs have same large-scale information. The large-scale information includes one or more of delay spread, Doppler spread, a Doppler frequency shift, an average gain, an average delay, and a spatial reception parameter. Optionally, the network device may send, by using a same beam or beams that are close (parameters such as weights or directions are close) to each other, the SSBs that have the QCL relationship.

At a receiving end, the terminal may combine the first SSB and the second SSB that have the QCL relationship, so that a stable gain can be obtained on both the LOS channel and the NLOS channel.

A QCL correspondence between the first SSB and the second SSB may be directly specified in the protocol. For example, a correspondence between an index of the first SSB and an index of the second SSB is defined, and the SSBs corresponding to the indexes have the QCL relationship.

In a possible implementation, the protocol separately specifies an index of a second SSB, and specifies that there is the QCL relationship between first SSBs with a same index and the second SSB with the specified index. For example, the protocol specifies that indexes occupied by the second SSB are 0 to L−1, and indexes occupied by the first SSB that has the QCL relationship with the second SSB are also represented as 0 to L−1. FIG. 3I is a diagram of a correspondence between an index of a first SSB and an index of a second SSB according to an embodiment of this application. As shown in FIG. 3I, in slots 0, 1, 2, and 3, each slot includes candidate locations of two first SSBs, where candidate locations in the slots may be used to send eight first SSBs, and corresponding indexes of the first SSBs are 0 to 7. Similarly, in slots 5, 6, 7, and 8, each slot includes candidate locations of two second SSBs, where candidate locations in the slots may be used to send eight second SSBs, and corresponding indexes of the second SSBs are 0 to 7. The protocol may specify that the first SSBs whose indexes are 0 to 7 have a QCL relationship with the second SSBs.

The foregoing example shows a group of second SSBs. To further enhance coverage, the protocol may introduce a plurality of groups of second SSBs. Each group of second SSBs has a same maximum quantity of SSBs that can be sent as the first SSB, for example, has L SSB candidate locations, and has the QCL relationship with an original SSB.

Figure 3J:
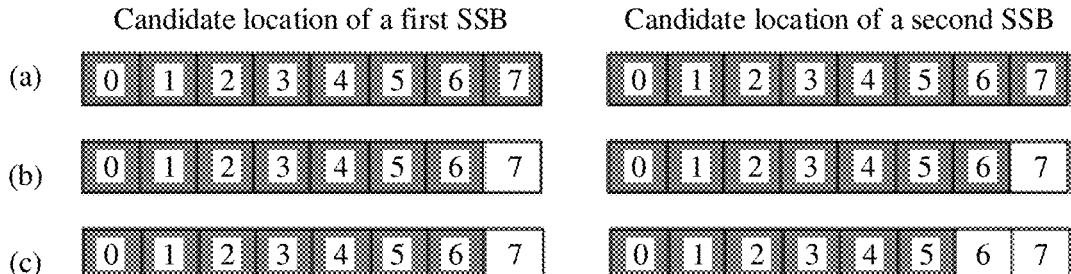
FIG. 3J is a diagram of a correspondence between an index for sending a first SSB and an index for sending a second SSB according to an embodiment of this application.

It is assumed that a quantity of candidate locations of a group of first SSBs is L, and second SSBs that have the QCL relationship with the first SSBs also have L candidate locations. A network device may select all or some of the L candidate locations to send the first SSB. For example, the network device may select K of the L SSB candidate locations to send the first SSB, where K is less than or equal to L. Optionally, FIG. 3J is a diagram of a correspondence between an index for sending a first SSB and an index for sending a second SSB according to an embodiment of this application. A network device may select K candidate locations from L candidate locations occupied by the second SSB to send the second SSB. L=8 is used as an example. As shown in (a) in FIG. 3J, when K=L=8, to be specific, all candidate locations occupied by the first SSB are used to send the first SSB, all candidate locations occupied by the second SSB corresponding to index values of the candidate locations occupied by the first SSB are used to send the second SSB. Alternatively, as shown in (b) in FIG. 3J, when K<L (where K=7 in the figure), K candidate locations of the L candidate locations occupied by the first SSB are used to send the first SSB, and K candidate locations occupied by the second SSB corresponding to index values of the K candidate locations occupied by the first SSB are used to send the second SSB. The second SSB sent in the foregoing two manners may be referred to as an SSB set-level second SSB, which can ensure that coverage of SSBs of all beams is enhanced. In another possible implementation, the network device sends the second SSB at $K_1$ candidate locations occupied by the second SSB, where $K_1$ is less than K, and the second SSB may be referred to as an SSB-level second SSB. Specifically, as shown in (c) in FIG. 3J, K candidate locations of L candidate locations occupied by the first SSB are used to send the first SSB, and in K candidate locations occupied by the second SSB corresponding to index values of the K candidate locations occupied by the first SSB, $K_1$ candidate locations are used to send the second SSB (where $K_1$=6 in the figure). In this way, in some scenarios, when some beams do not have a coverage enhancement requirement, an objective of reducing overheads can be achieved by using the SSB-level second SSB.

In addition, the protocol may alternatively specify that the first SSB and the second SSB are sent by using same precoding, or sent on a same port. In this case, a terminal may perform joint channel estimation on a PBCH of the first SSB and a PBCH of the second SSB.

When the first SSB is an original SSB, and the second SSB is a newly added SSB (or referred to as a supplementary SSB), the network device may notify, by using signaling such as radio resource control (RRC), the terminal of the following information: whether there is a supplementary SSB, a quantity of supplementary SSBs, an index of the supplementary SSB, and the like. After accessing a network, the terminal may perform rate matching based on the foregoing information. In other words, the terminal considers that a PDSCH sent by the network device does not perform resource mapping at a time-frequency location occupied by the supplementary SSB. In addition, the terminal may alternatively be provided with the foregoing information when performing radio resource management (RRM) measurement.

After finding a PSS and/or an SSS in an initial access procedure, the terminal may perform PSS and/or SSS detection on a corresponding supplementary SSB at a location of the supplementary SSB. If the supplementary SSB is successfully detected, the terminal may combine PBCHs and/or SSSs of the original SSB and the supplementary SSB, and perform joint decoding or detection, to improve initial access performance.

The second SSB and the first SSB may have a same time-frequency structure, to be specific, both include a PSS, an SSS, and a PBCH, and both have a same time-frequency location. However, if the second SSB and the first SSB have a completely consistent time-frequency structure, some problems may be caused. For example, it is assumed that the second SSB is located at other slot locations (for example, the slots 4, 5, 6, and 7, or the slots 5, 6, 7, and 8 in FIG. 3E) in a half-frame in time domain, and a frequency domain location is in a synchronization grid defined in NR. In this case, a legacy terminal (legacy UE), for example, in R15/16, may detect the second SSB. However, an SSB location assumed by the legacy terminal is always in a slot 0 to a slot 3. Therefore, the detection may cause the terminal to obtain incorrect time synchronization information. As a result, a series of subsequent errors occur and access performance is affected.

Figure 3K:
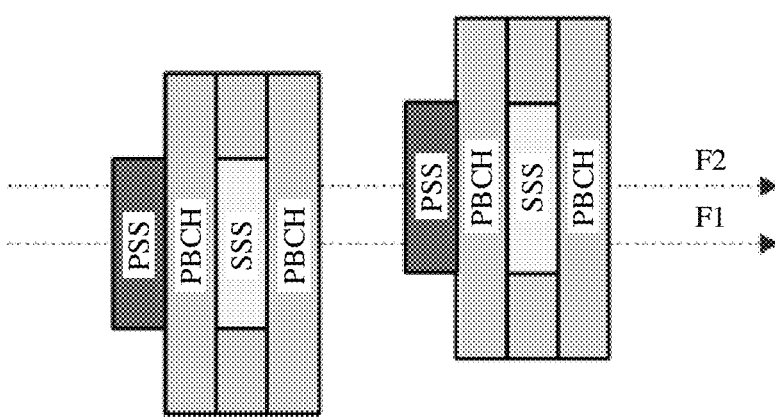
FIG. 3K is a schematic diagram of differentiated setting methods for a second SSB according to an embodiment of this application.
Figure 3K:
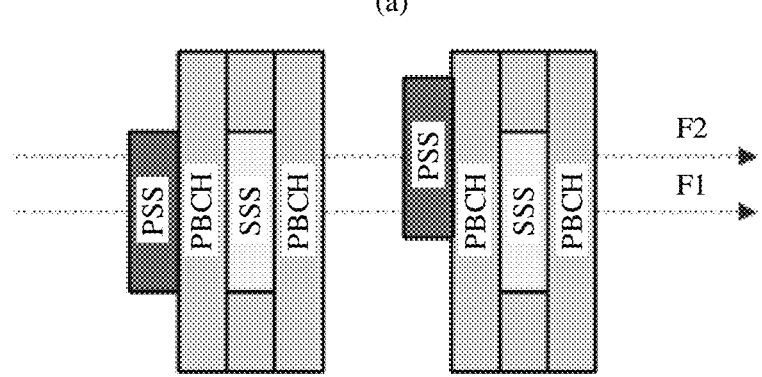
Figure 3K:
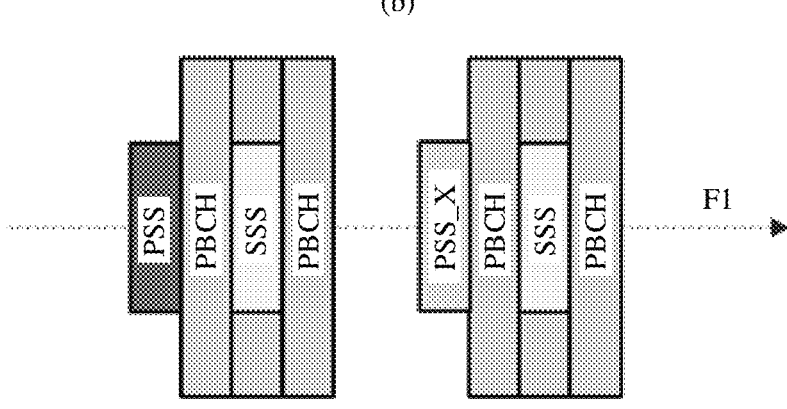

Therefore, differentiated setting is performed on the second SSB and the first SSB, so that the legacy terminal can perform transparent processing on the second SSB. To be specific, in terms of the protocol, the legacy terminal does not detect the second SSB. For the differentiated setting of the second SSB, refer to FIG. 3K. FIG. 3K is a schematic diagram of differentiated setting methods for a second SSB according to an embodiment of this application. Specific descriptions are as follows:

Frequency domain method 1: As shown in (a) in FIG. 3K, a second SSB and a first SSB have a same time-frequency structure, but the second SSB is always not located in a synchronization grid. For example, if an original SSB is located in the synchronization grid, a frequency domain location of the original SSB is F1, and there is a frequency domain offset between a frequency domain location of the second SSB and a frequency domain location of the first SSB, the frequency domain location of the second SSB is F2=F1+ΔF, where ΔF may be a positive number or a negative number, so that F2 is not in the synchronization grid.

Frequency domain method 2: As shown in (b) in FIG. 3K, there is a frequency offset ΔF between a composition signal PSS (and/or SSS) of a second SSB and a PSS of a first SSB, and a time-frequency structure of a remaining composition of the second SSB is consistent with a time-frequency structure of a remaining composition of the first SSB.

Code domain method: As shown in (c) in FIG. 3K, a PSS (and/or an SSS) sequence of a second SSB is different from an original PSS sequence, and a remaining time-frequency composition is the same as that of a first SSB. During special implementation, the second SSB does not include the PSS.

It should be understood that, the foregoing plurality of differentiated setting methods may be used together. In other words, there may be one or more of the foregoing differences between the second SSB and the first SSB.

It can be learned that in this embodiment of this application, the second SSB and the first SSB are set differently, so that a legacy terminal can perform transparent processing on the second SSB, to prevent incorrect detection of the legacy terminal, and further avoid an access error of the legacy terminal.

In addition, for FR1 (the case B and the case C), the foregoing embodiment provides two time domain locations ((a) and (b) in FIG. 3E) occupied by the second SSB, to adapt to different TDD configurations. However, in an initial access process, a terminal (not the legacy terminal) cannot determine a TDD configuration used by a base station, and therefore cannot obtain a specific location of the second SSB. Although the terminal may determine a specific time domain location of the second SSB through sequence detection, when the terminal can receive signals of a plurality of beams at the same time, an incorrect result may be obtained through sequence detection.

Therefore, the protocol may notify the specific time domain location of the second SSB in another manner. For example, in combination with the foregoing differentiation manner, the protocol may define different values of ΔF to correspond to different time domain locations occupied by the second SSB. For example, the protocol may specify that when the second SSB is located in slots 5, 6, 7, and 8, there is ΔF>0; when the second SSB is located in slots 4, 5, 6, and 7, there is ΔF<0. In this case, sequence detection may be performed, according to different ΔF assumptions, at different candidate locations occupied by the second SSB, to achieve an objective of cross verification, and the specific time domain location of the second SSB may be determined when it is determined whether there is the second SSB.

After obtaining the first SSB and the second SSB, the terminal may perform PBCH detection, to obtain information such as a downlink system bandwidth, a system frame number, and a cell-specific antenna port of a cell. Alternatively, the terminal performs reference signal received power (RSRP) measurement based on the obtained SSB, and determines, based on a coverage strength level, a data service and the like that can be initiated.

Figure 4:
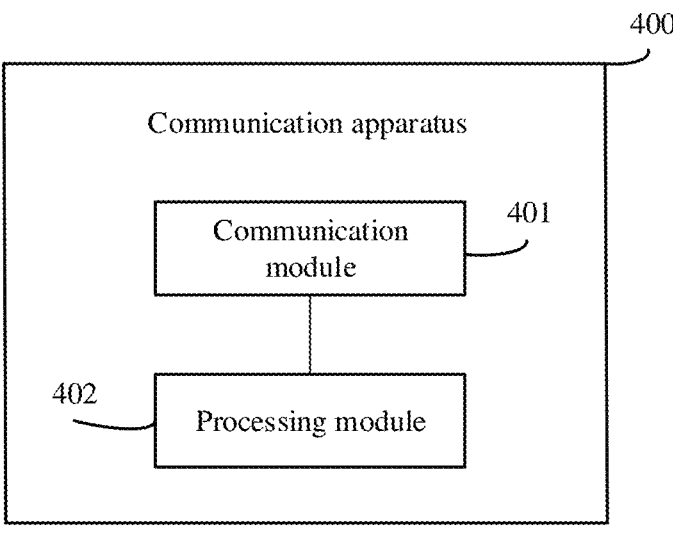
FIG. 4 is a block diagram of a structure of a communication apparatus according to an embodiment of this application.

FIG. 4 shows a communication apparatus 400 according to an embodiment of this application. The communication apparatus may be configured to perform the foregoing synchronization signal transmission method and the specific embodiment that are applied to a terminal in FIG. 3A to FIG. 3K. The terminal may be a terminal device or a chip that may be configured in the terminal device. The communication apparatus includes a communication module 401 and a processing module 402.

The processing module 402 is configured to obtain, through detection by using the communication module 401, a first synchronization signal block SSB at a first candidate location.

The processing module 402 is configured to: determine a second candidate location based on the first candidate location, and obtain, through detection, a second SSB at the second candidate location, where there is a correspondence between the first candidate location and the second candidate location.

The processing module 402 is further configured to perform physical broadcast channel PBCH detection or reference signal received power RSRP measurement based on the first SSB and/or the second SSB.

Optionally, the correspondence is a correspondence between slot locations and/or symbol locations occupied by the first candidate location and the second candidate location in one data half-frame.

Optionally, the correspondence between the slot locations and/or the symbol locations includes locations with a same symbol index that are occupied by the first candidate location and the second candidate location in slots with a fixed interval.

Optionally, the correspondence between the slot locations and/or the symbol locations includes symbol locations with a fixed interval that are of the first candidate location and the second candidate location in a same slot, and the fixed interval is equal to or greater than a quantity of symbols occupied by the first SSB.

Optionally, when a subcarrier spacing is 30 kHz, an index of a start symbol occupied by the first candidate location is {4, 8, 16, 20}+28*n, where n=0 or 1; and an index of a start symbol occupied by the second candidate location is {4, 8, 16, 20}+28*n+14, where n=2 or 3; an index of a start symbol occupied by the second candidate location is {4, 8, 16, 20}+28*n−14, where n=3 or 4; or an index of a start symbol occupied by the second candidate location is {4, 8, 16, 20}+28*n, where n=2 or 3.

Optionally, when a subcarrier spacing is 30 kHz, an index of a start symbol occupied by the first candidate location is {2, 8}+14*n, where n=0, 1, 2, or 3; and an index of a start symbol occupied by the second candidate location is {2, 8}+14*n, where n=5, 6, 7, or 8; or an index of a start symbol occupied by the second candidate location is {2, 8}+14*n, where n=4, 5, 6, or 7.

Optionally, when a subcarrier spacing is 30 kHz, an index of a start symbol occupied by the first candidate location is {4, 16}+28*n, where n=0 or 1, and the index is {4, 16}+28*m+14, where m=2 or 3; and an index of a start symbol occupied by the second candidate location is {8, 20}+28*n, where n=0 or 1, and the index is {8, 20}+28*m+14, where m=2 or 3.

Optionally, when a subcarrier spacing is 30 kHz, an index of a start symbol occupied by the first candidate location is {4, 16}+28*n, where n=0, 1, 2, or 3; and an index of a start symbol occupied by the second candidate location is {8, 20}+28*n, where n=0, 1, 2, or 3.

Optionally, when a subcarrier spacing is 30 kHz, an index of a start symbol occupied by the first candidate location is 2+14*n, where n=0, 1, 2, 3, 5, 6, 7, or 8; and an index of a start symbol occupied by the second candidate location is 8+14*n, where n=0, 1, 2, 3, 5, 6, 7, or 8.

Optionally, when a subcarrier spacing is 30 kHz, an index of a start symbol occupied by the first candidate location is 2+14*n, where n=0, 1, 2, 3, 4, 5, 6, or 7; and an index of a start symbol occupied by the second candidate location is 8+14*n, where n=0, 1, 2, 3, 4, 5, 6, or 7.

Optionally, there is a correspondence between the first SSB and the second SSB.

Optionally, the correspondence includes: The terminal assumes that there is a quasi co-location relationship or a co-port relationship between the first SSB and the second SSB.

Optionally, there is a frequency domain offset between the second SSB and the first SSB, and the first SSB is located in a synchronization raster.

Optionally, there is a frequency domain offset between a composition signal of the second SSB and a composition signal of the first SSB, and the composition signal includes a primary synchronization signal PSS and/or a secondary synchronization signal SSS.

Optionally, a PSS sequence of the second SSB is different from a PSS sequence of the first SSB, or the second SSB does not include a PSS.

Optionally, the processing module 402 may be a chip, an encoder, an encoding circuit, or another integrated circuit that can implement the method in this application.

Optionally, the communication module 401 may be an interface circuit or a transceiver. The communication module 401 may be an independent module, or may be integrated as a transceiver module (not shown in the figure). The transceiver module may implement functions of the communication module 401. The transceiver module may be an interface circuit or a transceiver.

A specific method and embodiment have been described above, and the apparatus 400 is configured to perform the synchronization signal transmission method corresponding to the terminal. Therefore, for a specific function related to the method, refer to a related part in the corresponding embodiment. Details are not described herein again.

Optionally, the apparatus 400 may further include a storage module (not shown in the figure). The storage module may be configured to store data and/or signaling, and the storage module may be coupled to the processing module 402, or may be coupled to the communication module 401. For example, the processing module 402 may be configured to read data and/or signaling in the storage module, so that the synchronization signal transmission method in the foregoing method embodiment is performed.

Figure 5:
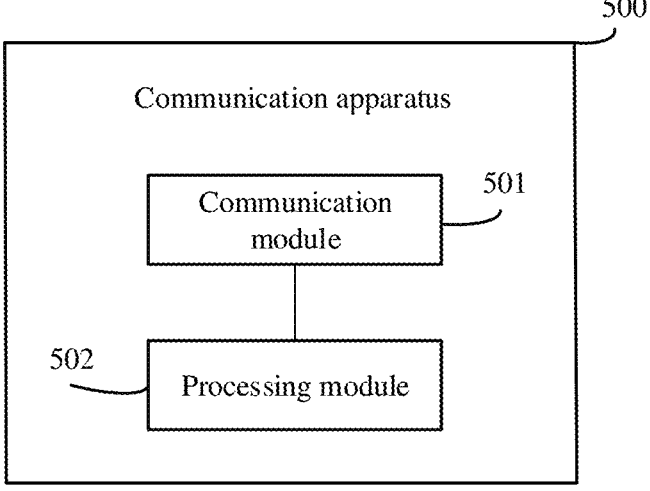
FIG. 5 is a block diagram of a structure of another communication apparatus according to an embodiment of this application.

FIG. 5 shows another communication apparatus 500 according to an embodiment of this application. The communication apparatus may be configured to perform the foregoing synchronization signal transmission method and the specific embodiment that are applied to a network device in FIG. 3A to FIG. 3K. The apparatus may be a network device or a chip that may be configured in the network device. In a possible implementation, as shown in FIG. 5, the communication apparatus 500 includes a communication module 501 and a processing module 502.

The communication module 501 is configured to send a first SSB at a first candidate location.

The processing module 502 is configured to determine a second candidate location based on a correspondence between the first candidate location and the second candidate location.

The communication module 501 is further configured to send a second SSB at the second candidate location.

A sequence of a process in which the communication module sends the first SSB and a process in which the processing module determines the second candidate location may alternatively be determining the second candidate location first, and then sending the first SSB. This is not limited in this embodiment of this application.

Optionally, the correspondence is a correspondence between slot locations and/or symbol locations occupied by the first candidate location and the second candidate location in one data half-frame, and the processing module 502 is specifically configured to determine the second candidate location based on the slot location and/or the symbol location of the first candidate location.

Optionally, the correspondence between the slot locations and/or the symbol locations includes locations with a same symbol index that are occupied by the first candidate location and the second candidate location in slots with a fixed interval.

Optionally, the correspondence between the slot locations and/or the symbol locations includes symbol locations with a fixed interval that are of the first candidate location and the second candidate location in a same slot, and the fixed interval is equal to or greater than a quantity of symbols occupied by the first SSB.

Optionally, when a subcarrier spacing is 30 kHz, an index of a start symbol occupied by the first candidate location is {4, 8, 16, 20}+28*n, where n=0 or 1; and the processing module 502 is specifically configured to: determine that an index of a start symbol occupied by the second candidate location is {4, 8, 16, 20}+28*n+14, where n=2 or 3; determine that an index of a start symbol occupied by the second candidate location is {4, 8, 16, 20}+28*n−14, where n=3 or 4; or determine that an index of a start symbol occupied by the second candidate location is {4, 8, 16, 20}+28*n, where n=2 or 3.

Optionally, when a subcarrier spacing is 30 kHz, an index of a start symbol occupied by the first candidate location is {2, 8}+14*n, where n=0, 1, 2, or 3; and the processing module 502 is specifically configured to: determine that an index of a start symbol occupied by the second candidate location is {2, 8}+14*n, where n=5, 6, 7, or 8; or determine that an index of a start symbol occupied by the second candidate location is {2, 8}+14*n, where n=4, 5, 6, or 7.

Optionally, when a subcarrier spacing is 30 kHz, an index of a start symbol occupied by the first candidate location is {4, 16}+28*n, where n=0 or 1, and the index is {4, 16}+28*m+14, where n=2 or 3; and the processing module 502 is specifically configured to: determine that an index of a start symbol occupied by the second candidate location is {8, 20}+28*n, where n=0 or 1, and the index is {8, 20}+28*m+14, where n=2 or 3.

Optionally, when a subcarrier spacing is 30 kHz, an index of a start symbol occupied by the first candidate location is {4, 16}+28*n, where n=0, 1, 2, or 3; and the processing module 502 is specifically configured to: determine that an index of a start symbol occupied by the second candidate location is {8, 20}+28*n, where n=0, 1, 2, or 3.

Optionally, when a subcarrier spacing is 30 kHz, an index of a start symbol occupied by the first candidate location is 2+14*n, where n=0, 1, 2, 3, 5, 6, 7, or 8; and the processing module 502 is specifically configured to: determine that an index of a start symbol occupied by the second candidate location is 8+14*n, where n=0, 1, 2, 3, 5, 6, 7, or 8.

Optionally, when a subcarrier spacing is 30 kHz, an index of a start symbol occupied by the first candidate location is 2+14*n, where n=0, 1, 2, 3, 4, 5, 6, or 7; and the processing module 502 is specifically configured to: determine that an index of a start symbol occupied by the second candidate location is 8+14*n, where n=0, 1, 2, 3, 4, 5, 6, or 7.

Optionally, there is a correspondence between the first SSB and the second SSB.

Optionally, there is a frequency domain offset between the second SSB and the first SSB, and the first SSB is located in a synchronization raster.

Optionally, there is a frequency domain offset between a composition signal of the second SSB and a composition signal of the first SSB, and the composition signal includes a primary synchronization signal PSS and/or a secondary synchronization signal SSS.

Optionally, a PSS sequence of the second SSB is different from a PSS sequence of the first SSB, or the second SSB does not include a PSS.

Optionally, the processing module 502 may be a chip, an encoder, an encoding circuit, or another integrated circuit that can implement the method in this application.

Optionally, the communication module 501 may be an interface circuit or a transceiver. The communication module 501 may be an independent module, or may be integrated as a transceiver module (not shown in the figure). The transceiver module may implement functions of the communication module 501. The transceiver module may be an interface circuit or a transceiver.

A specific method and embodiment have been described above, and the apparatus 500 is configured to perform the synchronization signal transmission method corresponding to the network device. Therefore, for specific functions related to the method, and in particular, for functions of the communication module 501 and the processing module 502, refer to a related part in the corresponding embodiment. Details are not described herein again.

Optionally, the apparatus 500 may further include a storage module (not shown in the figure). The storage module may be configured to store data and/or signaling, and the storage module may be coupled to the processing module 502, or may be coupled to the communication module 501. For example, the processing module 502 may be configured to read data and/or signaling in the storage module, so that the synchronization signal transmission method in the foregoing method embodiment is performed.

Figure 6:
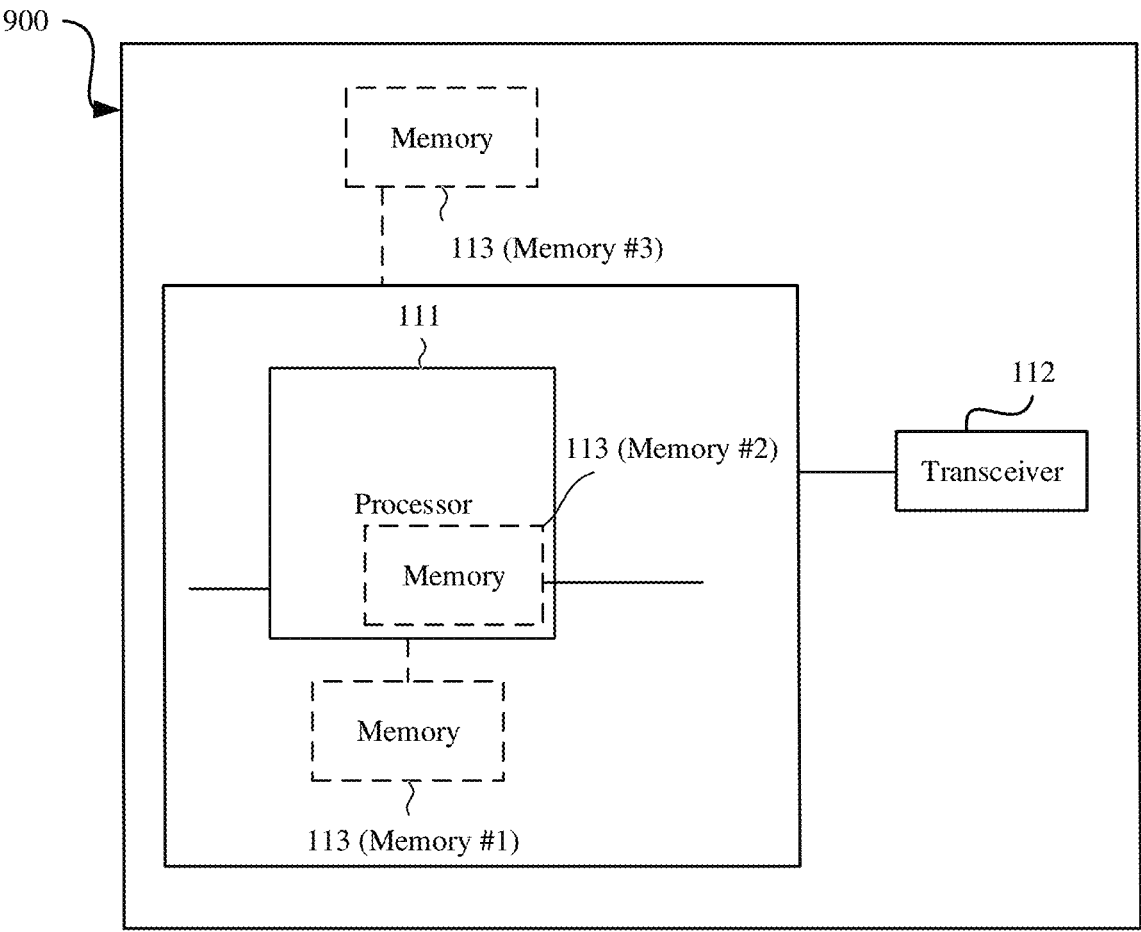
FIG. 6 is a schematic diagram of a structure of a communication apparatus according to an embodiment of this application.

FIG. 6 is a schematic diagram of a structure of a communication apparatus according to an embodiment of this application. For a structure of a terminal or a positioning device, refer to the structure shown in FIG. 6. The communication apparatus 900 includes a processor 111 and a transceiver 112. The processor 111 is electrically coupled to the transceiver 112.

The processor 111 is configured to execute some or all of computer program instructions in the memory, and when the some or all of the computer program instructions are executed, the apparatus is enabled to perform the method in any one of the foregoing embodiments.

The transceiver 112 is configured to communicate with another device, for example, obtain, through detection, a first synchronization signal block SSB at a first candidate location.

Optionally, the apparatus further includes a memory 113, configured to store computer program instructions. Optionally, the memory 113 (Memory #1) is located in the apparatus; the memory 113 (Memory #2) is integrated with the processor 111; or the memory 113 (Memory #3) is located outside the apparatus.

It should be understood that the communication apparatus 900 shown in FIG. 6 may be a chip or a circuit, for example, a chip or a circuit that may be disposed in the terminal apparatus or the communication apparatus. Alternatively, the transceiver 112 may be a communication interface. The transceiver includes a receiver and a transmitter. Further, the communication apparatus 900 may include a bus system.

The processor in, the memory 113, and the transceiver 112 are connected through the bus system. The processor 111 is configured to execute the instructions stored in the memory 113, to control the transceiver to receive a signal and send a signal, to complete the steps of the first device or the second device in the implementation method in this application. The memory 113 may be integrated into the processor 111, or may be disposed separated from the processor 111.

In an implementation, it may be considered that functions of the transceiver 112 are implemented by using a transceiver circuit or a dedicated transceiver chip. It may be considered that the processor 111 is implemented by using a dedicated processing chip, a processing circuit, a processor, or a general-purpose chip. The processor may be a central processing unit (CPU), a network processor (NP), or a combination of the CPU and the NP. The processor may further include a hardware chip or another general-purpose processor. The foregoing hardware chip may be an application-specific integrated circuit (ASIC), a programmable logic device (PLD), or a combination thereof. The PLD may be a complex programmable logic device (CPLD), a field programmable logic array (FPGA), a generic array logic (GAL) and another programmable logic device, a discrete gate or a transistor logic device, a discrete hardware component, or any combination thereof. The general-purpose processor may be a microprocessor, or the processor may be any conventional processor or the like.

It should be further understood that the memory mentioned in embodiments of this application may be a volatile memory or a non-volatile memory, or may include the volatile memory and the non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory described in this application aims to include but is not limited to these memories and any memory of another proper type.

An embodiment of this application provides a computer storage medium. The computer storage medium stores a computer program, and the computer program includes instructions used to perform the method corresponding to the terminal in the foregoing embodiment.

An embodiment of this application provides a computer storage medium. The computer storage medium stores a computer program, and the computer program includes instructions used to perform the method corresponding to the network device in the foregoing embodiment.

An embodiment of this application provides a computer program product including instructions. When the computer program product runs on a computer, the computer is enabled to perform the method corresponding to the terminal in the foregoing embodiment.

An embodiment of this application provides a computer program product including instructions. When the computer program product runs on a computer, the computer is enabled to perform the method corresponding to the network device in the foregoing embodiment.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that units and algorithm steps in the examples described with reference to embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the method described in embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus comprising:
at least one processor; and
a non-transitory computer-readable medium storing a program executable by the at least one processor, the program comprising instructions for:
obtaining a first synchronization signal block (SSB) at a first candidate location;
determining a second candidate location based on the first candidate location, and obtaining a second SSB at the second candidate location after determining the second candidate location from the first candidate location, wherein there is a correspondence between the first candidate location and the second candidate location; and
performing physical broadcast channel (PBCH) detection or reference signal received power (RSRP) measurement based on the first SSB and/or the second SSB.

2. The apparatus according to claim 1, wherein the correspondence is a correspondence between slot locations and/or symbol locations occupied by the first candidate location and the second candidate location in one data half-frame.

3. The apparatus according to claim 2, wherein the correspondence between the slot locations and/or the symbol locations comprises locations with a same symbol index that are occupied by the first candidate location and the second candidate location in slots with a fixed interval.

4. The apparatus according to claim 2, wherein the correspondence between the slot locations and/or the symbol locations comprises symbol locations with a fixed interval that are of the first candidate location and the second candidate location in a same slot, and the fixed interval is equal to or greater than a quantity of symbols occupied by the first SSB.

5. The apparatus according to claim 1, wherein there is a correspondence between the first SSB and the second SSB.

6. The apparatus according to claim 1, wherein there is a quasi co-location (QCL) relationship or a co-port relationship between the first SSB and the second SSB.

7. The apparatus according to claim 5, wherein a primary synchronization signal (PSS) sequence of the second SSB is different from a PSS sequence of the first SSB, or the second SSB does not comprise a PSS.

8. A method comprising:

sending, by a network device, a first synchronization signal block (SSB) at a first candidate location;

determining, by the network device, a second candidate location based on a correspondence between the first candidate location and the second candidate location; and sending, by the network device, a second SSB at the second candidate location after determining the second candidate location from the first candidate location.

9. The method according to claim 8, wherein the correspondence is a correspondence between slot locations and/or symbol locations occupied by the first candidate location and the second candidate location in one data half-frame, and the network device determines the second candidate location based on the slot location and/or the symbol location of the first candidate location.

10. The method according to claim 8, wherein the correspondence between the first candidate location and the second candidate location comprises a correspondence between slot locations and/or symbol locations occupied by the first candidate location and the second candidate location in one data half-frame, wherein the correspondence between the slot locations and/or the symbol locations comprises locations with a same symbol index that are occupied by the first candidate location and the second candidate location in slots with a fixed interval.

11. The method according to claim 8, wherein the correspondence between the first candidate location and the second candidate location comprises a correspondence between slot locations and/or symbol locations occupied by the first candidate location and the second candidate location in one data half-frame, wherein the correspondence between the slot locations and/or the symbol locations comprises symbol locations with a fixed interval that are of the first candidate location and the second candidate location in a same slot, and the fixed interval is equal to or greater than a quantity of symbols occupied by the first SSB.

12. The method according to claim 8, wherein there is a correspondence between the first SSB and the second SSB.

13. The method according to claim 12, wherein there is a frequency domain offset between the second SSB and the first SSB, and the first SSB is located in a synchronization raster.

14. The method according to claim 12, wherein a primary synchronization signal (PSS) sequence of the second SSB is different from a PSS sequence of the first SSB, or the second SSB does not comprise a PSS.

15. An apparatus comprising:

at least one processor; and a non-transitory computer-readable medium storing a program executable by the at least one processor, the program comprising instructions for:

sending a first synchronization signal block (SSB) at a first candidate location;

determining a second candidate location based on a correspondence between the first candidate location and the second candidate location; and sending a second SSB at the second candidate location after determining the second candidate location from the first candidate location.

16. The apparatus according to claim 15, wherein the correspondence is a correspondence between slot locations and/or symbol locations occupied by the first candidate location and the second candidate location in one data half-frame, and the program comprises further instructions for the apparatus to determine the second candidate location based on the slot location and/or the symbol location of the first candidate location.

17. The apparatus according to claim 15, wherein the correspondence between the first candidate location and the second candidate location comprises a correspondence between slot locations and/or symbol locations occupied by the first candidate location and the second candidate location in one data half-frame, wherein the correspondence between the slot locations and/or the symbol locations comprises locations with a same symbol index that are occupied by the first candidate location and the second candidate location in slots with a fixed interval.

18. The apparatus according to claim 15, wherein the correspondence between the first candidate location and the second candidate location comprises a correspondence between slot locations and/or symbol locations occupied by the first candidate location and the second candidate location in one data half-frame, wherein the correspondence between the slot locations and/or the symbol locations comprises symbol locations with a fixed interval that are of the first candidate location and the second candidate location in a same slot, and the fixed interval is equal to or greater than a quantity of symbols occupied by the first SSB.

19. The apparatus according to claim 15, wherein there is a correspondence between the first SSB and the second SSB.

20. The apparatus according to claim 19, wherein there is a frequency domain offset between the second SSB and the first SSB, and the first SSB is located in a synchronization raster.

* * * * *